United States Patent [19]
Kato et al.

[11] Patent Number: 6,072,651
[45] Date of Patent: Jun. 6, 2000

[54] INFORMATION RECORDING/ REPRODUCING APPARATUS FOR REPRODUCING INFORMATION WITHOUT REQUIRING TRACKING SERVO

[75] Inventors: Masahiro Kato; Shinichi Nagahara; Makiko Fujii, all of Tokorozawa, Japan

[73] Assignee: Pioneer Electronic Corporation, Tokyo, Japan

[21] Appl. No.: 09/055,697

[22] Filed: Apr. 7, 1998

[30] Foreign Application Priority Data

Apr. 8, 1997 [JP] Japan .................................. 9-089734

[51] Int. Cl.[7] .................................................. G11B 15/12
[52] U.S. Cl. ............................................................ 360/63
[58] Field of Search ........................... 360/63, 61, 77.12, 360/78.02, 62, 75

[56] References Cited

U.S. PATENT DOCUMENTS

| | | | |
|---|---|---|---|
| 5,262,908 | 11/1993 | Iwamatsu et al. | 360/77.12 |
| 5,353,176 | 10/1994 | Kosuge | 360/63 |
| 5,872,672 | 2/1999 | Chliwnyj et al. | 360/77.12 |
| 5,946,156 | 8/1999 | Schwarz et al. | 360/78.02 X |
| 5,946,159 | 8/1999 | Chliwnyj et al. | 360/77.12 |
| 5,982,711 | 11/1999 | Knowles et al. | 360/77.12 |

*Primary Examiner*—Paul Loomis
*Assistant Examiner*—James L. Habermehl
*Attorney, Agent, or Firm*—Sughrue, Mion, Zinn, Macpeak & Seas, PLLC

[57] ABSTRACT

An information recording/reproducing apparatus capable of correctly reproducing information from a large number of recording tracks without requiring tracking servo. A recording medium is formed with at least one pilot track on which a pilot signal is recorded and a plurality of information data tracks which have the same track width as the pilot track and on which information data is recorded, where the pilot track and the information data tracks are arranged adjacent to each other. The information recording/reproducing apparatus comprises a plurality of reading units arranged in a width direction of the tracks, and each having a tracing width equal to or smaller than one half of a width of the track, a pilot signal detector for detecting the pilot signal from each of read signals read by each of the reading units, a track determining unit for determining a corresponding relationship between each of the reading units and each of the information data tracks in accordance with a detection result provided by the pilot signal detector, and a unit for sequentially selecting a read signal in accordance with a determination result provided by the track determining unit from the read signals to output the selected read signal as a read signal corresponding to each of the information data tracks.

10 Claims, 28 Drawing Sheets

FIG.13
AU1
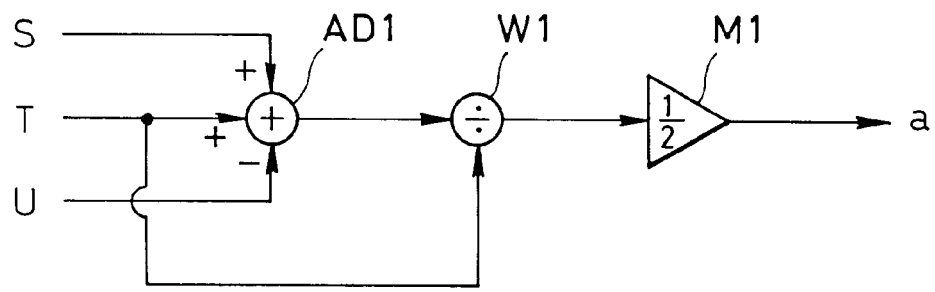
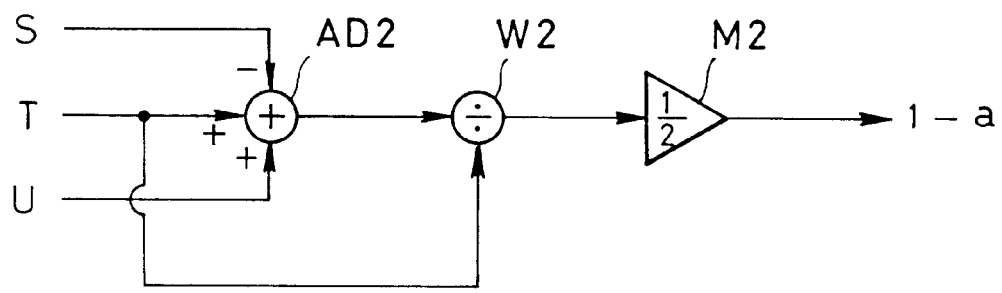

INFORMATION RECORDING/ REPRODUCING APPARATUS FOR REPRODUCING INFORMATION WITHOUT REQUIRING TRACKING SERVO

BACKGROUND OF THE INVENTION

1. Field of the Invention

The present invention relates to an information recording/ reproducing apparatus for recording information on a recording medium and reproducing information from such a recording medium.

2. Description of the Related Art

In magnetic recording/reproducing apparatus using a magnetic tape as a recording medium, a variety of technologies have been developed for purposes of achieving higher density recording. In the information recording/reproducing technologies, a surface recording density of such a magnetic tape is expressed by a product of a recording density in a tape running direction of the magnetic tape (linear recording density) and a recording density in a width direction orthogonal to the tape running direction (track density). In this respect, a magnetic recording/reproducing apparatus equipped with fixed magnetic heads such as a compact cassette deck, a digital compact cassette deck (hereinafter abbreviated as "DCC") or the like, generally has the number of magnetic heads equal to the number of tracks formed on a tape. It should be noted here that the number of magnetic heads refers to the number of combination heads, each of which is composed of a recording head and a reproducing head.

FIG. 1 illustrates a corresponding relationship between a magnetic head assembly of a DCC deck and recording tracks formed on a recording surface of a magnetic tape by the magnetic head assembly.

Referring specifically to FIG. 1, the magnetic head assembly of the DCC deck comprises a recording head section 6 and a reproducing head section 8. The recording surface of a magnetic tape 7 is divided into a sector A for recording digital data and a sector B for recording analog data. In this event, the sector B is provided for establishing compatibility with compact cassette tapes of analog recording scheme.

The recording head section 6 is provided with nine induction-type recording magnetic heads W0–W8 for recording information on the sector A of the recording tape 7.

The reproducing head section 8 in turn is provided with reproducing magnetic heads R0–R8 each for reading recorded information from associated one of recording tracks T0–T8. The magnetic recording heads W0–W8 each have a width $\tau_1$ equal to 185 $\mu$m, and are arranged at intervals of 195 $\mu$m. With these magnetic heads W0–W8, the tracks T0–T8 having the same width as the above-mentioned width $\tau_1$, i.e., 185 $\mu$m, and a track width equal to 195 $\mu$m are formed on the sector A of the magnetic tape 7, as illustrated in FIG. 1. On the other hand, the magnetic heads R0–R8 in the reproducing head section 8 each have a width $\tau_2$ equal to 70 $\mu$m, and are arranged at intervals of 195 $\mu$m.

As will be appreciated from the foregoing, each of the reproducing magnetic heads R0–R8 has the width $\tau_2$ narrower than the track width $\tau_1$. This configuration enables correct information to be reproduced from the respective tracks even if the center positions of the respective reproducing magnetic heads R0–R9 are slightly shifted in the tape width direction with respect to the center positions of the respective recording tracks T0–T8.

For example, even if the reproducing magnetic head R0 has its center position shifted by $(\tau_1-\tau_2)/2$ in the tape width direction with respect to the center position of the recording track T0, this reproducing magnetic head R0 does trace on the recording track T0. Therefore, when the magnetic tape 7 is simply provided with a tape running guide such that a relative positional shift between each reproducing magnetic head and each recording track associated therewith is not more than the above-mentioned $(\tau_1-\tau_2)/2$, correct information can be reproduced from each recording track without conducting tracking servo.

When the number of recording tracks recorded on the magnetic tape 7 is to be increased, the width $\tau_1$ of each recording magnetic head is reduced to correspondingly increase the number of recording tracks. However, as each recording magnetic head is narrower and the width of each recording track formed thereby is correspondingly narrower, relative alignment of respective reproducing magnetic heads with associated recording tracks becomes difficult only by the use of the tape running guide, thus resulting in track shifts.

Thus, the magnetic recording/reproducing apparatus equipped with fixed recording heads, such as the DCC deck cited above, have a problem that the number of recording tracks cannot be arbitrarily increased as desired.

OBJECTS AND SUMMARY OF THE INVENTION

The present invention has been made to solve the problem mentioned above, and its object is to provide an information recording/reproducing apparatus which is capable of correctly reproducing information from a large number of recording tracks without requiring tracking servo.

An information recording/reproducing apparatus according to the present invention is an information recording/ reproducing apparatus for reproducing recorded information from a recording medium on which information data is recorded, wherein the recording medium is formed with at least one pilot track on which a pilot signal is recorded and a plurality of information data tracks on which the information data is recorded, and the at least one pilot track and the information data tracks is arranged adjacent to each other, characterized by comprising a plurality of reading means arranged in a width direction of the tracks, each of the reading means having a tracing width equal to or smaller than one half of a width of the track, pilot signal detecting means for detecting the pilot signal from each of read signals read by each of the reading means, track determining means for determining a corresponding relationship between each of the reading means and each of the information data tracks in accordance with a detection result provided by the pilot signal detecting means in order to enable information to be correctly reproduced from a large number of recording tracks without requiring tracking servo, and means for sequentially selecting a read signal in accordance with a determination result provided by the track determining means from the read signals to output the selected read signal as a read signal corresponding to each of the information data tracks.

BRIEF DESCRIPTION OF THE DRAWINGS

FIG. 13 is a schematic circuit diagram illustrating the internal configuration of a coefficient calculating circuit AU1 in FIG. 10;

DESCRIPTION OF THE PREFERRED EMBODIMENTS

Figure 1:
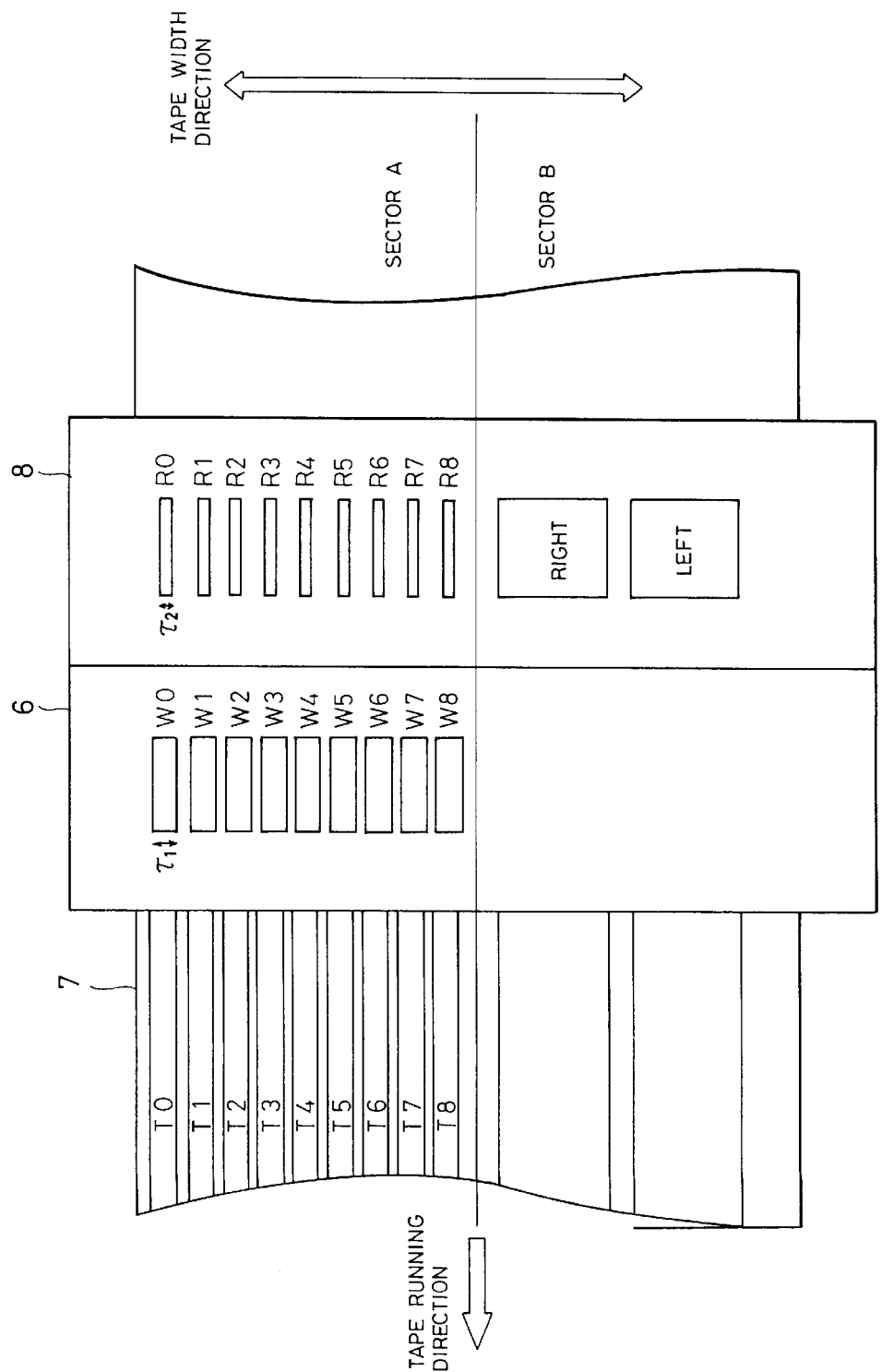
FIG. 1 is a diagram illustrating a corresponding relationship between a magnetic head assembly of a DCC deck and recording tracks.
Figure 2:
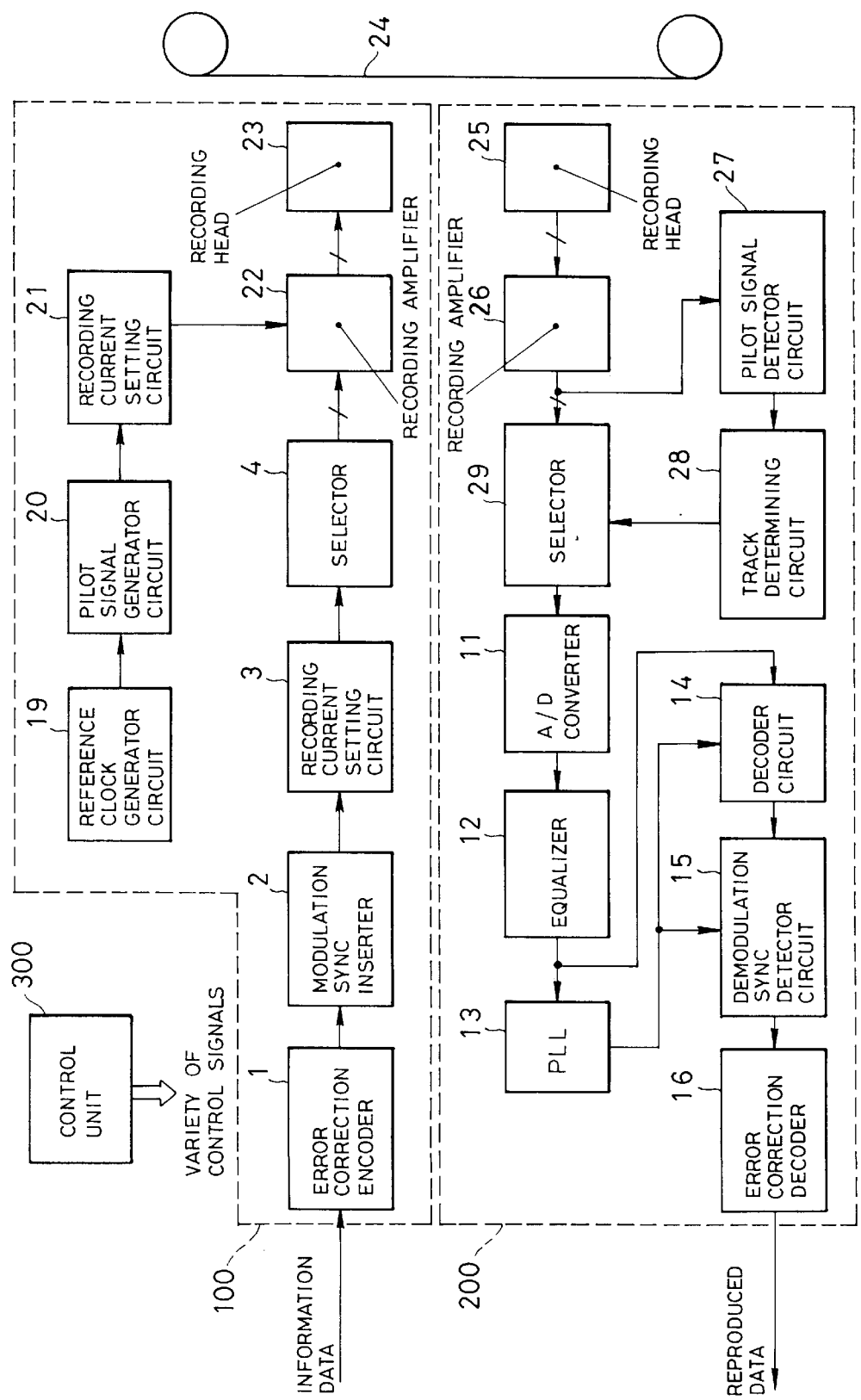
FIG. 2 is a block diagram illustrating the configuration of an information recording/reproducing apparatus according to a first embodiment of the present invention.

FIG. 2 is a block diagram illustrating the configuration of an information recording/reproducing apparatus according to a first embodiment of the present invention.

As illustrated in FIG. 2, the information recording/reproducing apparatus according to the first embodiment comprises a recording system 100 for recording information data on a magnetic tape 24 as a recording medium, a reproducing system 200 for reproducing recorded information from the magnetic tape 24, and a control unit 300 for generating a variety of control signals to control the recording system 100 and the reproducing system 200, respectively.

First, the recording system 100 will be described.

An error correction encoder 1 conducts error correction encoding processing on information data to be recorded using an error correcting code such as Reed-Solomon code, and supplies the resulting encoded information data to a modulation SYNC inserter 2. In this event, the information data is in the form of serial digital data. The modulation SYNC inserter 2, for example, 8–10 modulates the encoded information data supplied from the error correction encoder 1, adds a reference signal to each of frames in the 8–10 modulated information data, and supplies the resulting modulated data to a recording current setting circuit 3. The recording current setting circuit 3 generates a recording data signal for driving a recording head assembly 23, later described, with an optimal current value based on the modulated data, and supplies the recording data signal to a selector 4. The selector 4 has n output terminals so as to selectively output the recording data signal supplied from the recording current setting circuit 3 from any of these n output terminals.

A pilot signal generator circuit 20, in response to a pilot signal recording start instruction from the control unit 300, generates a pilot signal at a predetermined frequency based on an oscillating signal generated in a reference clock generator circuit 19, and supplies the pilot signal to a recording current setting circuit 21. It should be noted that the pilot signal used herein is a frequency signal having a wavelength approximately 10 to 50 times larger than that of the recording data signal. The recording current setting circuit 21 generates a recording pilot signal for driving the recording head assembly 23 with an optimal current value based on the pilot signal, and supplies the recording pilot signal to a recording amplifier unit 22. The recording amplifier unit 22 amplifies signals supplied from the respective n output terminals of the selector 4 and the recording pilot signal, respectively, as desired, and supplies the amplified signals to the recording head assembly 23.

Figure 3:
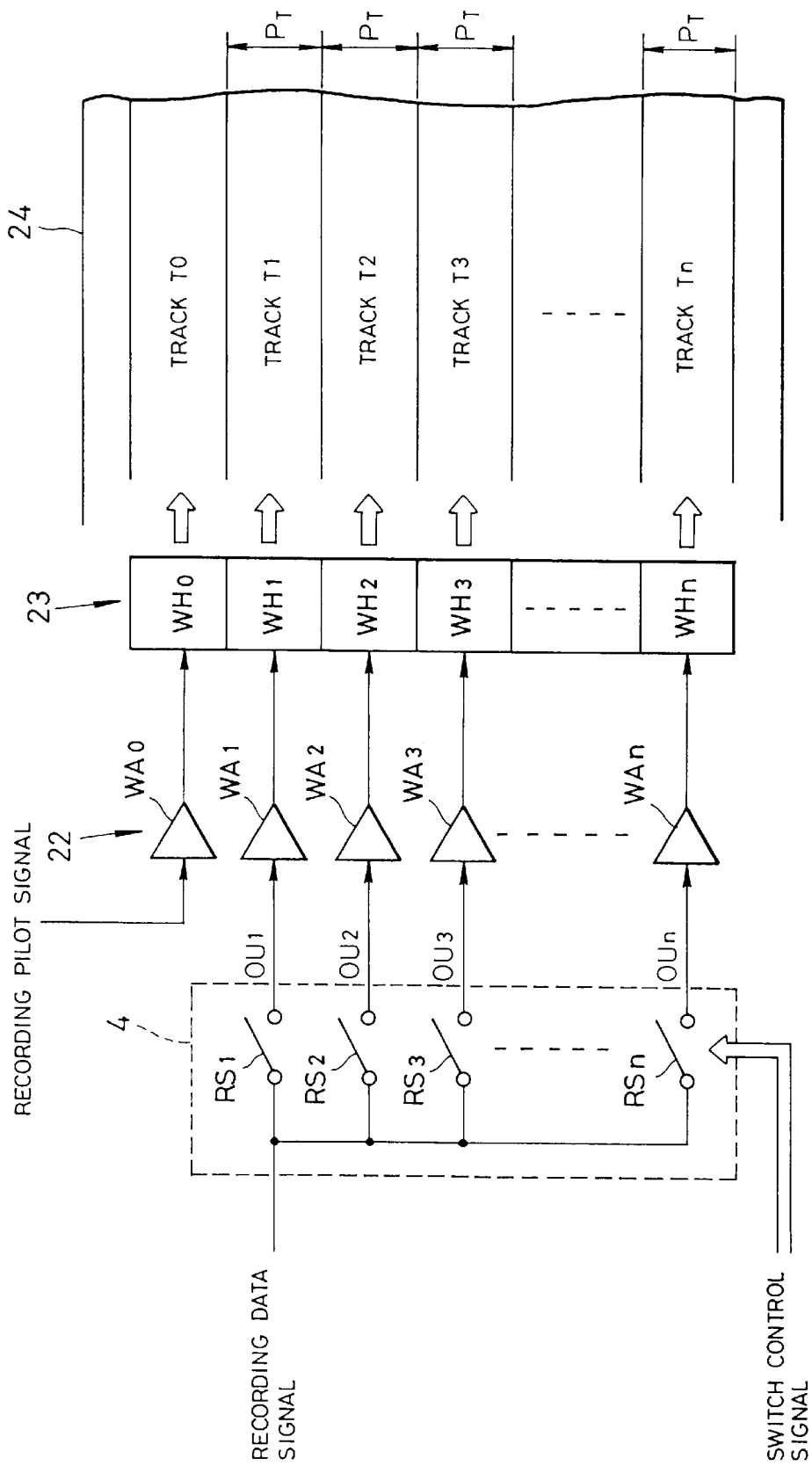
FIG. 3 illustrates in detail exemplary configurations of a selector 4, a recording amplifier unit 22 and a recording head assembly 23 in FIG. 2.

FIG. 3 illustrates in detail exemplary configurations of the above-mentioned selector 4, recording amplifier unit 22 and recording head assembly 23.

As illustrated in FIG. 3, the selector 4 comprises n switches $RS_1$–$RS_n$ for selectively outputting a recording data signal from the recording current setting circuit 3. Each of these switches $RS_1$–$RS_n$ is individually ON-OFF controlled in response to a switch control signal supplied from the control unit 300. Output terminals $OU_1$–$OU_n$ of the respective switches $RS_1$–$RS_n$ are connected to associated amplifiers $WA_1$–$WA_n$ as the recording amplifier unit 22. The amplifiers $WA_1$–$WA_n$ each amplify signals from the respective output terminals OU1–OUn associated therewith as desired, and supplies associated magnetic heads $WH_1$–$WH_n$ in the recording head assembly 23 with the respective amplified signals. The recording heads $WH_1$–$WH_n$ sequentially record signals from the associated amplifiers $WA_1$–$WA_n$ on a recording tape 24 to form tracks T1–Tn on the recording tape 24, respectively, wherein each track has a track width designated by PT. A recording pilot signal from the recording current setting circuit 21 in turn is amplified by an amplifier $WA_0$ as desired, and supplied to a magnetic head $WH_0$. The magnetic head $WH_0$ sequentially records the signal from the amplifier $WA_0$ on the magnetic tape 24 to form a track T0 as illustrated in FIG. 3.

Figure 4:
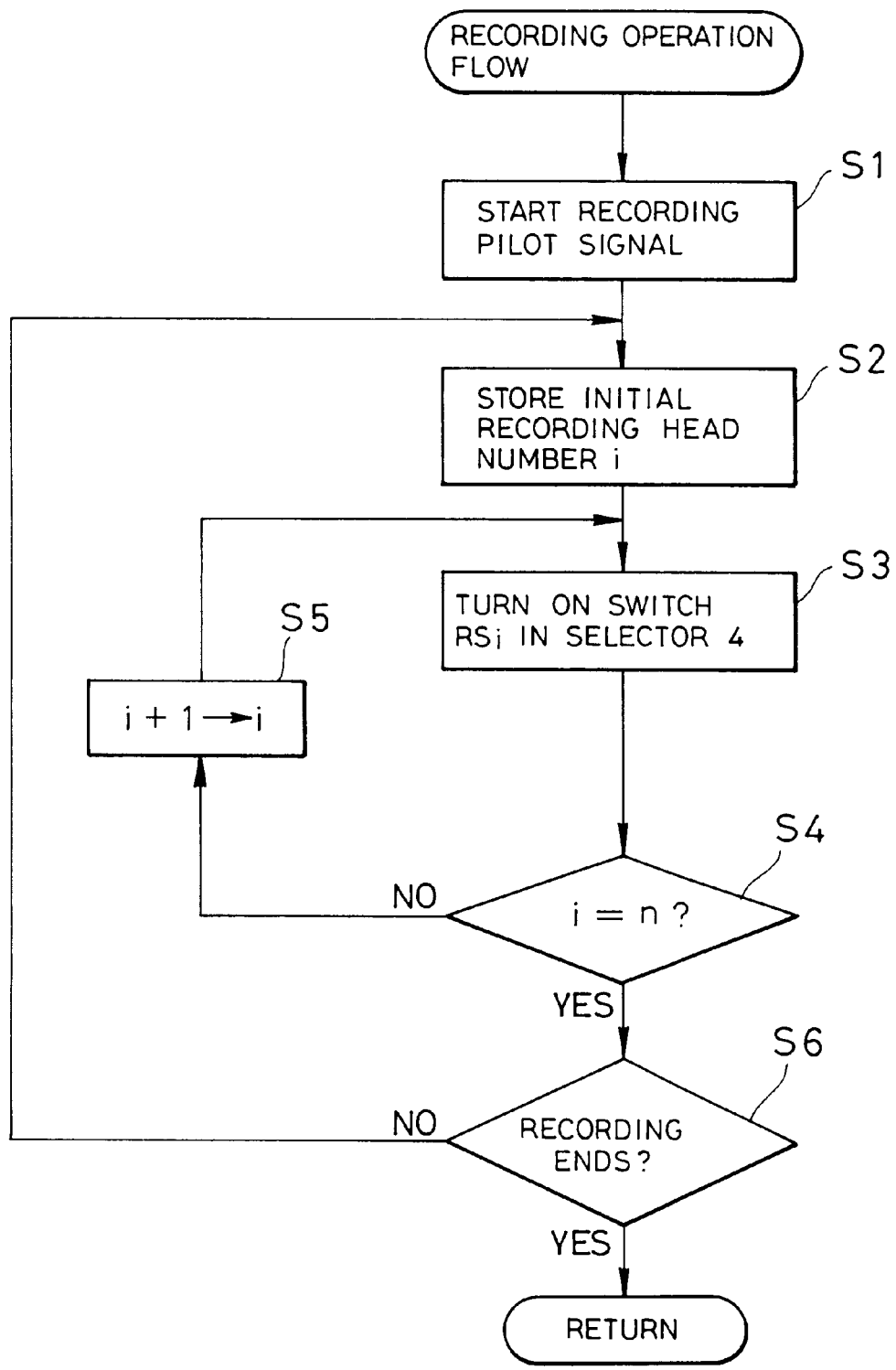
FIG. 4 is a flow diagram representing an operation flow of a control unit 300 during a recording operation of a recording system 100 illustrated in FIG. 2.
Figure 5:
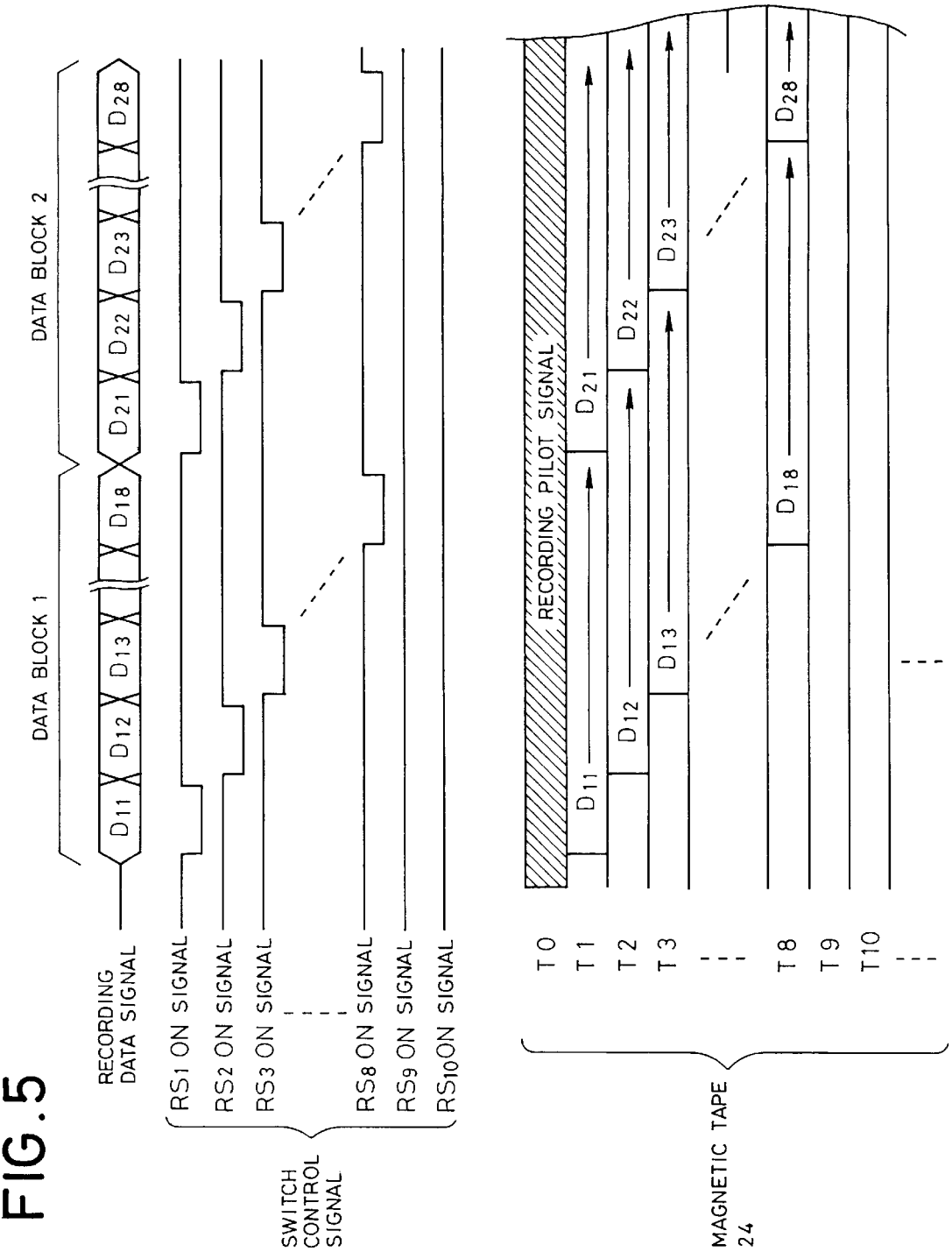
FIG. 5 is a timing diagram illustrating an example of a recording operation performed by the recording system 100 in FIG. 2.

FIG. 4 is a flow diagram representing an operation flow performed by the recording system 100 under the control of the control unit 300, and FIG. 5 is a timing diagram illustrating an example of a recording operation implemented by the execution of the operation flow.

More specifically, FIG. 5 illustrates an exemplary operation for distributively recording a recording data signal having a data block length of 8 bits ($D_1$–$D_8$) on tracks T1–T8 on a magnetic tape 24.

Referring first to FIG. 4, the control unit 300 first supplies a recording start instruction to the pilot signal generator circuit 20 (step S1). In response to the execution of step S1, the magnetic head $WH_0$ in the recording head assembly 23 records the pilot signal on a track T0 on the magnetic tape 24 as indicated by hatching in FIG. 5. Next, the control unit 300 stores an initial recording head number as a recording head number i in a built-in register (not shown) (step S2). Next, the control unit 300 supplies the selector 4 with an $RS_i$ON signal at logical value "0" as a switch control signal to turn ON a switch $RS_i$ having a number indicated by the recording head number i stored in the built-in register within the switches in the selector 4 (step S3). In response to the execution of step S3, the magnetic head $WH_i$ records a signal supplied thereto through an associated amplifier $WA_i$ on a track $T_i$ on the magnetic tape 24. Next, the control unit 300 determines whether or not the recording head number i is equal to "n" (step S4). It should be noted that the number "n" indicates the total number of tracks used to record one unit of information data. If it is determined at step S4 that the recording head number i is not equal to "n", the control unit 300 adds "1" to the recording head number i, and overwrites the built-in register with the resulting value as a new recording head number i (step S5). After the end of step S5, the control unit 300 returns to the execution of the above-mentioned step S3 to repetitively execute the operations as described above.

Assume herein that the initial recording head number stored at the above-mentioned step S2 is "1," the total number n of tracks used to record one unit of information data is "8," and a recording data signal as illustrated in FIG. 5 is supplied to the selector 4.

In this event, during a period in which a first bit $D_{11}$ in a data block 1 of the recording data is being supplied to the selector 4, the execution of step S3 causes the $RS_1$ON signal at logical value "0" to be supplied to the selector 4. In response to this operation, the magnetic head $WH_1$ performs magnetic recording corresponding to a logical value of the first bit $D_{11}$ on the track T1 on the magnetic tape 24, as illustrated in FIG. 5. In this event, since the recording head number i is "1," steps S4 and S5 are executed to increment the recording head number i to "2." Then, as illustrated in FIG. 5, when a second bit $D_{12}$ in the data block 1 is supplied to the selector 4, an $RS_2$ON signal at logical value "0" is supplied to the selector 4 in response to the execution of step S3. Then, in response to this operation, the magnetic head $WH_1$ is changed to the magnetic head $WH_2$ which performs magnetic recording corresponding to a logical value of the second bit $D_{12}$ on the track T2 on the magnetic tape 24, as illustrated in FIG. 5. Since the recording head number i is now "2," steps S4 and S5 are executed to increment the recording head number i to "3." Then, as illustrated in FIG. 5, when a third bit $D_{13}$ in the data block 1 is supplied to the selector 4, an $RS_3$ON signal at logical value "0" is supplied to the selector 4 in response to the execution of step S3. Then, in response to this operation, the magnetic head $WH_2$ is changed to the magnetic head $WH_3$ which performs magnetic recording corresponding to a logical value of the third bit $D_{13}$ on the track T3 on the magnetic tape 24, as illustrated in FIG. 5. Subsequently, the steps S3–S5 are repetitively executed in a similar manner to sequentially turn ON the switches $RS_3$–$RS_8$ of the selector 4 to record a fourth bit $D_{14}$ to an eighth bit $D_{18}$ in the data block 1 on associated tracks T4–T8, as illustrated in FIG. 5.

If it is determined at step S4 that the recording head number i is equal to "n," the control unit 300 next determines whether or not a user has issued a recording operation end instruction (step S6). If it is determined at step S6 that the user has not issued a recording operation end instruction, the control unit 300 returns to the execution of step S2 as described above. More specifically, the recording head number i is reset to an initial number, and the recording data signal is again recorded on tracks $T_i$–$T_n$. For example, in FIG. 5, since a first bit $D_{21}$ to an eighth bit $D_{28}$ in a data block 2 are sequentially recorded on associated tracks $T_1$–$T_8$ in a manner similar to the first bit $D_{11}$ to the eighth bit $D_{18}$ in the data block 1.

On the other hand, if it is determined at step S6 that the user has issued a recording operation end instruction, the control unit 300 terminates the control operation in accordance with this flow.

As described above, a recording data signal corresponding to information data is distributively recorded on tracks $T_i$–$T_n$ as information data tracks, while a pilot signal at a predetermined frequency is recorded on the track T0 as a pilot track.

Next, the reproducing system 200 in FIG. 2 will be described.

The reproducing head assembly 25 is provided with m MR (magnetoresistive) type heads. These m MR type heads respectively read recorded information from a magnetic tape 24 and supply resulting m read signals to a reproducing amplifier unit 26. The reproducing amplifier unit 26 amplifies these m read signal respectively as desired, and supplies the resulting m amplified read signals to a selector 29 and to a pilot signal detector circuit 27.

The pilot signal detector circuit 27 detects which of the m heads in the reproducing head assembly 25 has read a pilot signal, based on the m amplified read signals, and supplies a track determining circuit 28 with a pilot detecting signal corresponding to a detected head. The track determining circuit 28 determines, based on the pilot detecting signal, whether or not each of m heads in the reproducing head assembly 25 has read any of tracks formed on the magnetic tape as illustrated in FIG. 3. The track determining circuit 28 generates a selection control signal in accordance with the determination result, and supplies a selector 29 with this selection control signal. The selector 29 selects one of the m amplified read signals from the reproducing amplifier unit 26 in accordance with the selection control signal, and supplies an A/D converter 11 with the selected signal as a time division multiplexed read signal.

The A/D converter 11 samples the time division multiplexed read signal to convert it into digital values which are supplied to an equalizer 12. The equalizer 12 waveform-equalizes the digital values to compensate for inter-symbol interference in the digital values, and supplies a PLL (Phase Locked Loop) circuit 13 with the resulting compensated digital values. The PLL circuit 13 generates, based on the compensated digital values, a reproducing clock signal which follows variations in frequency and phase of the read signals due to fluctuations in tape speed. A decoder circuit 14 performs a binary-value determination on the compensated digital values at the timing of the reproducing clock signal, and supplies the resulting binary values to a demodulation SYNC detector circuit 15. The demodulation SYNC detector circuit 15 detects a reference signal in each frame within the binary value signal, 8–10 demodulates the binary value signal, and supplies an error correction decoder 16 with the resulting demodulated data. The error correction decoder 16 corrects possible errors in the demodulated data in accordance with the detected reference signal, and outputs the corrected data as reproduced data.

Figure 6:
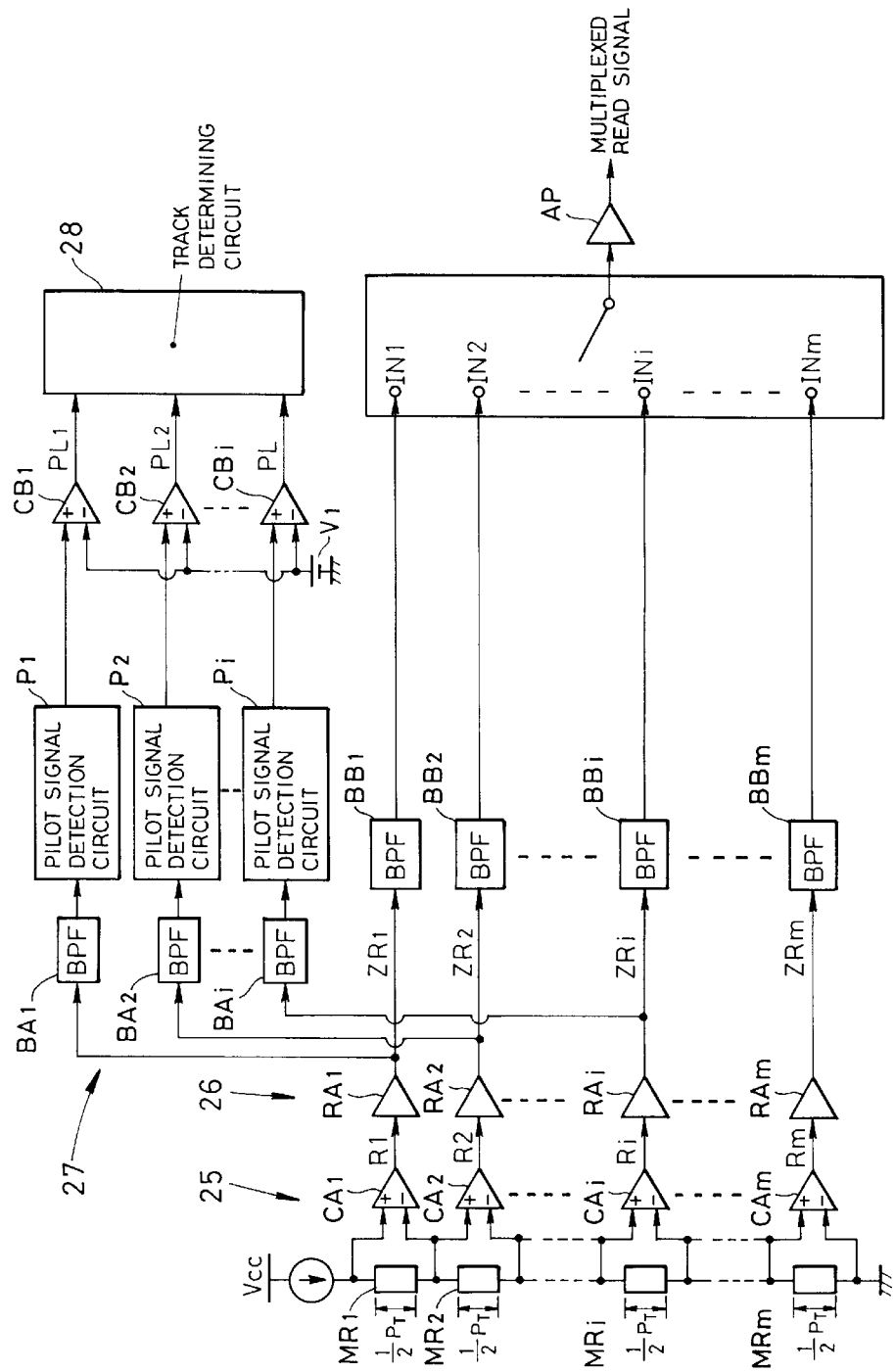
FIG. 6 is a block diagram illustrating detailed configurations of a reproducing head assembly 25, a reproducing amplifier unit 26, a pilot signal detector circuit 27, a track determining circuit 28 and a selector 29 in FIG. 2.

FIG. 6 is a block diagram illustrating in detail exemplary configurations of the above-mentioned reproducing head assembly 25, reproducing amplifier unit 26, pilot signal detector circuit 27, track determining circuit 28 and selector 29 in the reproducing system 200.

Referring specifically to FIG. 6, the reproducing head assembly 25 is provided with m MR type reproducing heads $MR_1$–$MR_m$ as mentioned above. It should be noted that these heads $MR_1$–$MR_m$ each have a tracing width on a recording tape 24 equal to one half of a track width PT of respective tracks formed on the magnetic tape 24. These heads $MR_1$–$MR_m$ are closely lined up in the tape width direction without any gap between adjacent ones. In other words, the number of reproducing heads $MR_1$–$MR_m$ is larger than the number of recording magnetic heads $WH_1$–$WH_n$ as mentioned above, and the magnitude relationship between these numbers is expressed by:

$$m > (2n+2)$$

As reading faces of the head $MR_1$–$MR_m$ trace a recording surface of the magnetic tape 24, voltages corresponding to respective recording data signals are generated at output terminals of the respective heads $MR_1$–$MR_m$.

Differential amplifiers $CA_1$–$CA_m$ disposed in the reproducing head assembly 25 each produce a voltage difference of outputs of associated heads $MR_1$–$MR_m$, and supply associated amplifiers $RA_1$–$RA_m$ in the reproducing amplifier unit 26 with the respective voltage differences as read signal $R_1$–$R_m$. The respective amplifiers $RA_1$–$RA_m$ amplify associated read signals R1–Rm as desired, and produce amplified read signals $ZR_1$–$ZR_m$.

Bandpass filters $BA_1$–$BA_i$ each extract a signal in a pilot signal band from the amplified read signals $ZR_1$–$ZR_i$ associated therewith, and supply associated pilot signal detection circuits $P_1$–$P_i$ with the extracted signals. These amplified read signals $ZR_1$–$ZR_i$ are reproduced from all heads $MR_1$–$MR_i$, which are predicted to trace the track T0 on which the pilot signal is recorded, within the aforementioned amplified read signals $ZR_1$–$ZR_m$. Also, extracted frequency bands defined by the respective bandpass filters $BA_1$–$BA_i$ depend on a tape running speed of the magnetic tape 24.

The pilot signal detection circuits $P_1$–$P_i$ detect the pilot signal from the signals supplied from the associated bandpass filters $BA_1$–$BA_i$ to produce detection signals, and supply associated comparators $CB_1$–$CB_i$ with the respective detection signals. The comparators $CB_1$–$CB_i$ each generate a pilot detecting signal PL, for example, at logical value "1" when the detection signals from the associated pilot signal detection circuits $P_1$–$P_i$ are higher than a predetermined level $V_1$, and generate the pilot detecting signal PL at logical value "0" when the detection signals are lower than the predetermined level $V_1$. The comparator $CB_1$–$CB_i$ each supply a track determining circuit 28 with associated pilot detecting signals $PL_1$–$PL_i$ each having a logical value as mentioned above.

The bandpass filters $BA_1$–$BA_i$, the pilot signal detection circuits $P_1$–$P_i$ and the comparators $CB_1$–$CB_i$ form the pilot signal detector circuit 27.

The track determining circuit 28 first selects all heads which have read the pilot signal, based on the signal logical values of the respective pilot detecting signals $PL_1$–$PL_i$ supplied from the pilot signal detector circuit 27. Next, the track determining circuit 28 sequentially selects the read signals read by respective reading means positioned at intervals of (N−1) from a head next to the head at an extreme end (on the track T1 side) of the selected heads, and determines that these are read signals read from the tracks T1–Tn. The above-mentioned number N (an integer equal to or more than two) represents the width of a track when a width traced by one head is "1."

The track determining circuit 28 generates a selection control signal in accordance with the determination result, and supplies the selector 29 with the selection control signal.

On the other hand, each of bandpass filters $BB_1$–$BB_n$ extracts a signal in an information data band from an associated one of the amplified read signal $ZR_1$–$ZR_m$, and supplies an associated input terminal $IN_1$–$IN_m$ of the selector 29 with the extracted signal as read an information data signal. It should be noted that extracted frequency bands defined by the respective bandpass filters $BB_1$–$BB_m$ depend on the tape running speed of the magnetic tape 24. The selector 29 selects one from the input terminals $IN_1$–$IN_m$ in accordance with the selection control signal supplied from the track determining circuit 28, and supplies an amplifier AP with a signal supplied to the selected input terminal IN. The amplifier AP amplifies the signal selected by the selector 29 as desired, and supplies the A/D converter 11 illustrated in FIG. 2 with the amplified signal as a time division multiplexed signal.

Next, the operation of the track determining circuit 28 will be described with reference to FIG. 7.

Figure 7:
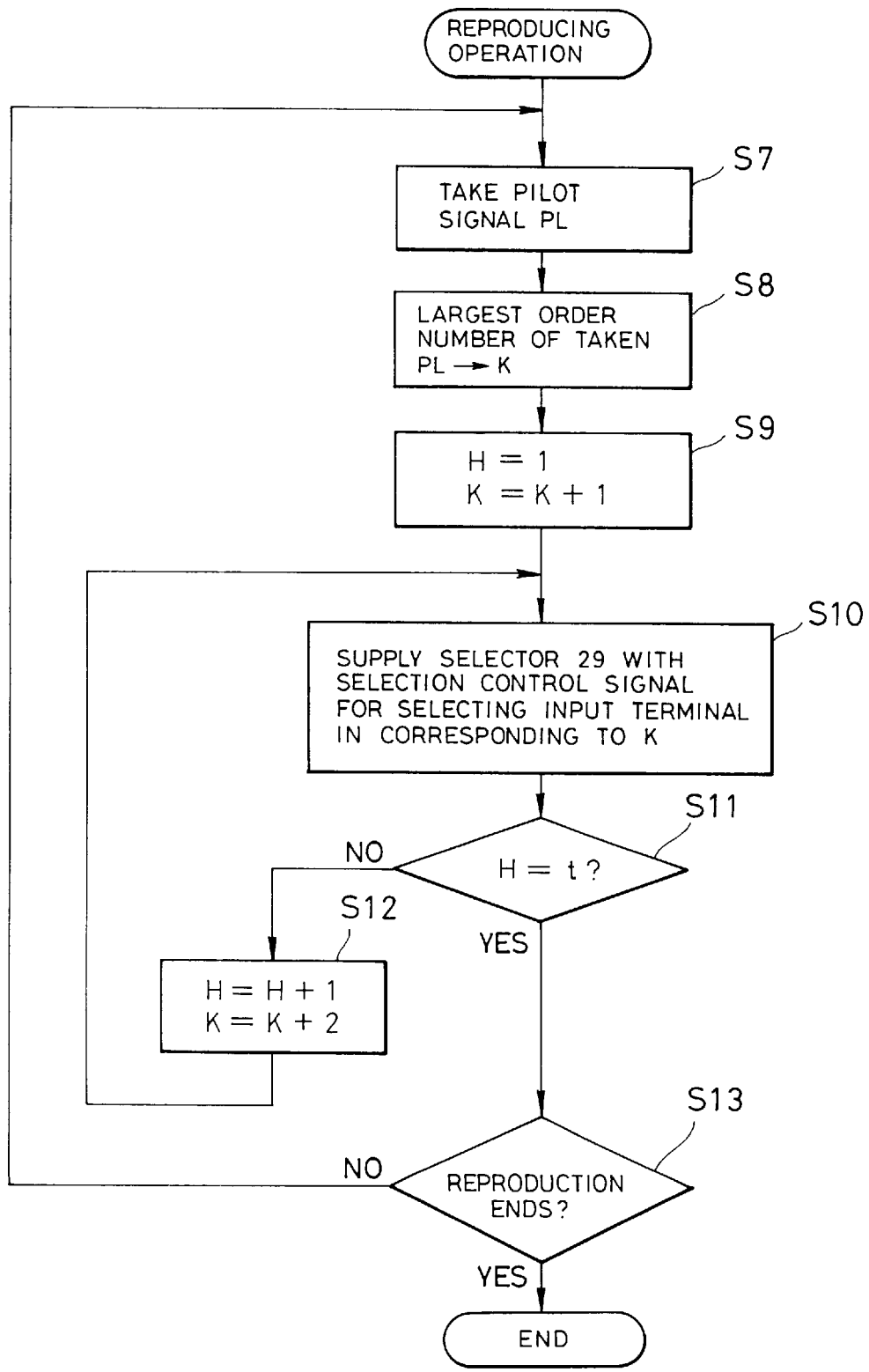
FIG. 7 is a flow diagram representing an operation flow of the track determining circuit 28 during a reproducing operation of a reproducing system 200 in FIG. 2.

FIG. 7 is a flow diagram representing an operation flow of the track determining circuit 28 during a reproducing operation.

Referring specifically to FIG. 7, a control circuit (not shown) disposed in the track determining circuit 28 fetches pilot detecting signals PL at logical value "1" from pilot detecting signals $PL_1$–$PL_i$ from the respective comparators $CB_1$–$CB_i$ illustrated in FIG. 6 (step S7). Next, the control circuit stores the largest signal number of signal numbers of the fetched pilot detecting signals PL in a register K (not shown) (step S8). For example, when fetched pilot detecting signals are $PL_3$ and $PL_4$, "4" is stored in the register K. Next, the control circuit stores "1" in a register H (not shown) as a read track number, and overwrites the register K with the sum of the stored contents of the register K and one (step S9). In this event, the value stored in the register K indicates a read head number within the heads $MR_1$–$MR_m$. Next, the control circuit supplies the selector 29 with a selection control signal for forcing the selector 29 to select an input terminal IN corresponding to the number indicated by the value stored in the register K (step S10). Then, the control circuit determines whether or not the read track number stored in the register H is equal to "t" (step S11). The value "t" indicates the number of tracks on which one unit of information data is distributively recorded. If it is determined at step S11 that the read track number stored in the register H is not equal to "t," the control circuit overwrites the register K with the sum of the stored contents of the register K and two, and overwrites the register H with the sum of the stored contents of the register H and one (step S12).

After the execution of step S12, the control circuit returns to the execution of step S10 as mentioned above. On the other hand, if it is determined at step S11 that the read track number stored in the register H is equal to "t," the control circuit next determines whether or not a reproducing operation end instruction has been issued from the control unit 300 illustrated in FIG. 2 (step S13). If it is determined at step S13 that no reproducing operation end instruction has been issued, the control circuit returns to the execution of step S7 as mentioned above. On the other hand, if it is determined at step S13 that the reproducing operation end instruction has been issued, the control circuit exits this operation flow and terminates the operation.

Figure 8:
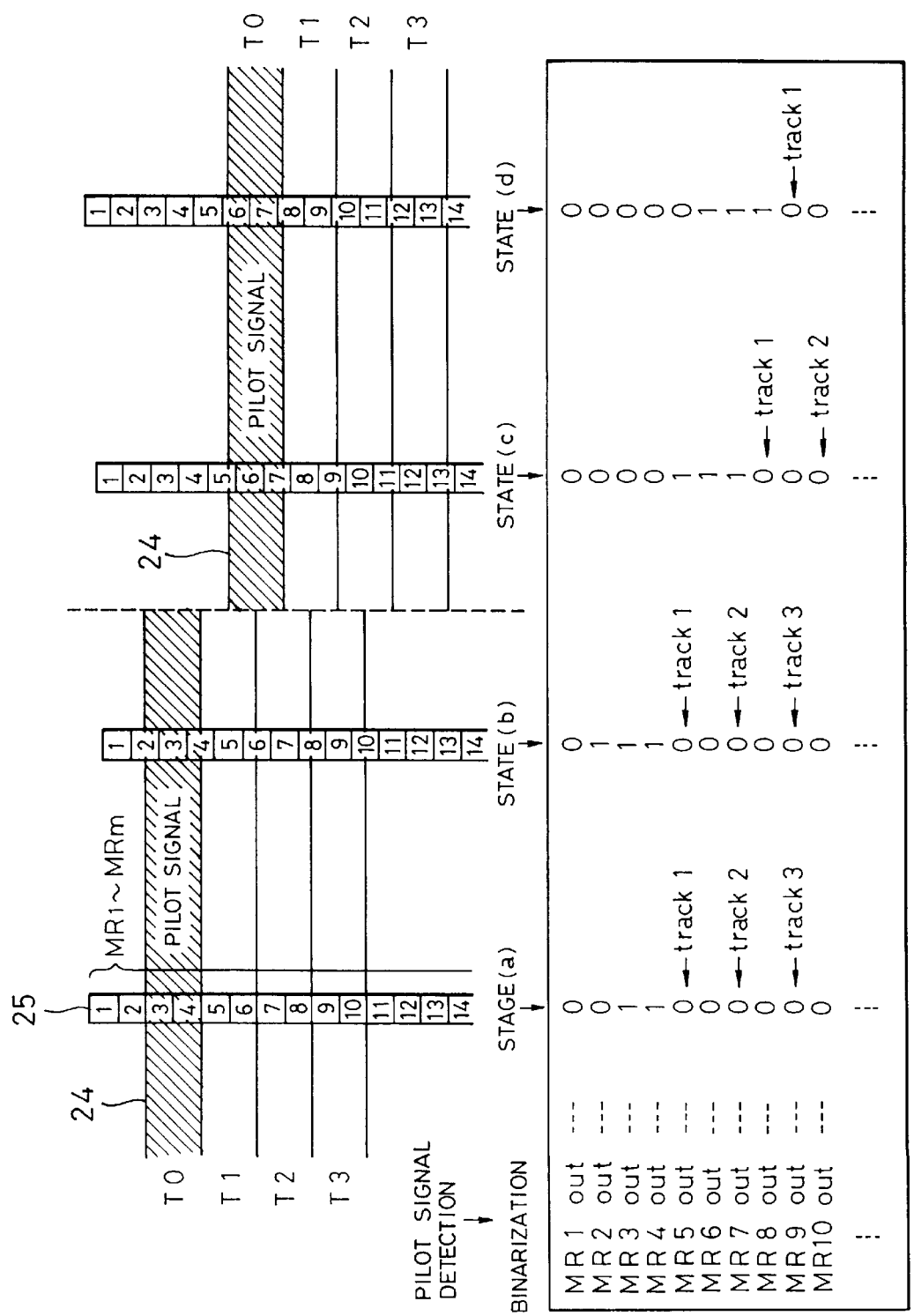
FIG. 8 is a diagram illustrating a positional relationship established when heads $MR_1$–$MR_m$ in FIG. 2 respectively trace associated tracks on a magnetic tape 24.

An exemplary operation for reading information from a magnetic tape 24 performed by the operations as described above will be described with reference to FIGS. 4, 8 and 9. FIG. 8 illustrates an example of a positional relationship established when the heads $MR_1$–$MR_m$ provided in the reproducing head assembly 25 read recorded information from associated tracks T0, T1, T2, . . . , Tn on the magnetic tape 24 (state (a)–state (d)). A broken line drawn in FIG. 8 indicates a starting time of discontinuous recording. Also, it is assumed that a pilot signal as indicated by hatching has previously been recorded on the track T0 shown in FIG. 8.

In the state (a) of FIG. 8, a pair of heads $MR_3$, $MR_4$ are ready to trace the track T0. Tracks T1–Tn are likewise traced by a pair of adjacent heads $MR_5$–$MR_{(2n+4)}$. Heads $MR_1$, $MR_2$ do not trace any track. In other words, only the heads $MR_3$, $MR_4$ within the heads $MR_1$–$MR_m$ read the pilot signal recorded on the track T0.

Thus, in the state (a) as described above, the track determining circuit 28 fetches pilot detecting signals PL3, PL4 corresponding to the heads $MR_3$. $MR_4$, respectively, by the execution of the aforementioned step S7 (FIG. 7). Next, the execution of step S8 selects the larger one of signal numbers of the respective pilot detecting signals PL3, PL4 which are "3" and "4," i.e., "4." The execution of step S9 adds one to the signal number "4" to derive a value "5" which is stored in the register K. Next, by the execution of step S10, the track determining circuit 28 supplies the selector 29 with a selection control signal for forcing the selector 29 to select an input terminal IN5 corresponding to the value "5" stored in the register K from the input terminals IN1–INm in the selector 29. This operation causes the selector 29 to selectively supply the amplifier AP with a signal read from the magnetic tape 24 by the head $MR_5$. Next, the execution of step S12 overwrites the register K with a value "7" calculated by adding two to the value "5" stored in the register K. After the end of this operation, the operation flow returns to the operation at step S10 to repetitively execute the operations as described above. The repetitive operations cause the selector 29 to sequentially select signals from heads having every other numbers from the head $MR_5$, i.e. , heads $MR_7$, $MR_9$, . . . , $MR_{(2n+3)}$ and supply these signals to the amplifier AP.

When information data is recorded on the magnetic tape 24 in a form as illustrated in FIG. 4, more specifically, when the information data has a data block length of eight bits which are divided and distributively recorded on eight tracks, a sequence of operations at steps S10 and S12 are repetitively executed eight times. When the eight repetitive operations are terminated, the flow returns to the execution of step S7.

With the operations described above, a signal corresponding to a first bit $D_1$ recorded in a hatched portion of a track T1 illustrated in FIG. 4 is first output from the amplifier AP as a time division multiplexed read signal, and then a signal corresponding to a second bit $D_2$ recorded in a hatched portion of a track T2 is output from the amplifier AP as the time division multiplexed read signal. Subsequently, read signals corresponding to a third bit $D_3$ to an eighth bit $D_8$ divided and recorded on tracks T3–T8 illustrated in FIG. 4 are similarly outputted in combination as the time division multiplexed signal.

In the state (b) of FIG. 8, the three heads $MR_2$–$MR_4$ are ready to trace the track T0. Therefore, each of the heads $MR_2$–$MR_4$ within the heads $MR_1$–$MR_m$ reads the pilot signal recorded on the track T0.

Thus, in the state (b), the track determining circuit 28 fetches pilot detecting signals PL2–PL4 corresponding to the heads $MR_2$–$MR_4$, respectively, by the execution of the aforementioned step S7 (FIG. 7). Next, the execution of step S8 selects the largest signal number of signal numbers "2"–"4" of the pilot detecting signals $PL_2$–$PL_4$, i.e., "4." Next, the execution of step S9 adds one to "4" to derive a value "5" which is stored in the register K. Then, by the execution of step S10, the track determining circuit 28 supplies the selector 29 with a selection control signal for forcing the selector 29 to select an input terminal IN5 corresponding to the value "5" stored in the register K from the input terminals IN1–INm in the selector 29. This operation causes the selector 29 to selectively supply the amplifier AP with a signal read from the magnetic tape 24 by the head $MR_5$ as a read signal from the track T1. Next, by the execution of step S12, the track determining circuit 28 overwrites the register K with a value "7" calculated by adding two to the value "5" stored in the register K. After the end of step S12, the operation flow returns to the operation at step S10 to repetitively execute the operations as described above. The repetitive operations cause the selector 29 to selectively supply the amplifier AP with signals from heads having every other numbers from the head $MR_5$, i.e., heads $MR_7$, $MR_9$, $MR_{(2n+3)}$ as read signals from the respective tracks T2–Tn.

In the state (c) in FIG. 8, i.e., at the time discontinuous recording is started, the three heads $MR_5$–$MR_7$ are ready to trace the track T0. Therefore, each of the heads $MR_5$–$MR_7$ within the heads $MR_1$–$MR_m$ reads the pilot signal recorded on the track T0.

Thus, in the state (c), the track determining circuit 28 fetches pilot detecting signals PL5–PL7 from the pilot signal detector circuit 27 by the execution of the aforementioned step S7 (FIG. 7). Next, the execution of step S8 selects the largest signal number of signal numbers "5"–"7" of the pilot detecting signals PL5–PL7, i.e., "7." Next, the execution of step S9 adds one to "7" to derive a value "8" which is stored in the register K. Then, by the execution of step S10, the track determining circuit 28 supplies the selector 29 with a selection control signal for forcing the selector 29 to select an input terminal IN8 corresponding to the value "8" stored in the register K from the input terminals IN1–INm in the selector 29. This execution of step S10 causes the selector 29 to selectively supply the amplifier AP with a signal read from the magnetic tape 24 by the head $MR_8$, as a read signal from the track T1. Next, the execution of step S12 overwrites the register K with a value "10" calculated by adding two to the value "8" stored in the register K. After the end of step S12, the operation flow returns to the operation at step S10 to repetitively execute the operations as described above. The repetitive operations cause the selector 29 to sequentially select signals from heads having every other numbers from the head $MR_8$, i.e., heads $MR_{10}$, $MR_{12}$, . . . , $MR_{(2n+6)}$ and supply the amplifier AP with the selected signals as read signals from the respective tracks T2–Tn. In this way, it is also possible to read recorded information from respective tracks even from a discontinuously recorded tape.

In the state (d) in FIG. 8, the three heads $MR_6$–$MR_8$ are ready to trace the track T0. Therefore, each of the heads $MR_6$–$MR_8$ within the heads $MR_1$–$MR_m$ reads the pilot signal recorded on the track T0.

Thus, in the state (d), the track determining circuit 28 fetches pilot detecting signals $PL_6$–$PL_8$ from the pilot signal detector circuit 27 by the execution of the aforementioned step S7 (FIG. 7). Next, the execution of step S8 selects the largest signal number of signal numbers "6"–"8" of the pilot detecting signals $PL_6$–$PL_8$, i.e., "8." Next, the execution of step S9 adds one to "8" to derive a value "9" which is stored in the register K. Then, by the execution of step S10, the track determining circuit 28 supplies the selector 29 with a selection control signal for forcing the selector 29 to select an input terminal IN9 corresponding to the value "9" stored in the register K from the input terminals IN1–INm in the selector 29. This execution of step S10 causes the selector 29 to selectively supply the amplifier AP with a signal read from the magnetic tape 24 by the head $MR_9$, as a read signal from the track T1. Next, the execution of step S12 overwrites the register K with a value "11" calculated by adding two to the value "9" stored in the register K. After the end of step S12, the operation flow returns to the operation at step S10 to repetitively execute the operations as described above.

The repetitive operations cause the selector 29 to sequentially select the amplifier AP with signals from heads having every other numbers from the head $MR_9$, i.e., heads $MR_{11}$, $MR_{13}$, . . . , $MR_{(2n+7)}$ and supply the amplifier AP with the selected signals as read signals from the respective tracks T2–Tn.

In the foregoing embodiment as described above, when information data is recorded on a magnetic tape 24, a pilot signal is recorded on a track T0 on the magnetic tape 24, and the information data is recorded on other tracks.

For reference, a reproducing head assembly suitable for reading recorded information from the magnetic tape 24 comprises a plurality of MR heads, each having a tracing width equal to one half of the track width of each track formed on the magnetic tape 24, lined up in the tape width direction without gap.

Then, all MR head which have read the pilot signal are detected based on the read signals read by the respective MR heads (step S7), the MR head positioned at an extreme end (on the track T1 side) is selected from the detected heads (step S8), and a read signal read by a MR head next to this MR head (toward the tracks on which information data is recorded) is discriminated to be a read signal read from the track T1 (steps S9, S10). Further, a read signal read by a MR head next but one from this discriminated MR head is discriminated as a read signal read from the track T2. Subsequently, read signals read by every other MR heads are similarly discriminated to be read signals retrieved from the respective tracks T3, T4, . . . , Tn (steps S12, S10).

Thus, according to the configuration described above, reproduction of correct information from a large number of recording tracks can be realized without requiring tracking servo.

In the foregoing embodiment, read signals read by every other MR heads are discriminated as read signals read from respective tracks because the width of each track is defined to be twice the tracing width of each head. More generally, when each track has a track width N times (N is an integer equal to or more than two) a tracing width, read signals read by heads selected at intervals of (N−1) may be discriminated as read signals read from respective tracks.

Also, while the embodiment illustrated in FIG. 4 has been described in connection with an operation for reading recorded information from a single track block consisting of the tracks T0–T8 formed on the magnetic tape 24, information can be read likewise when a plurality of track blocks are formed on a magnetic tape, in which case information is read from each track block.

Figure 9:
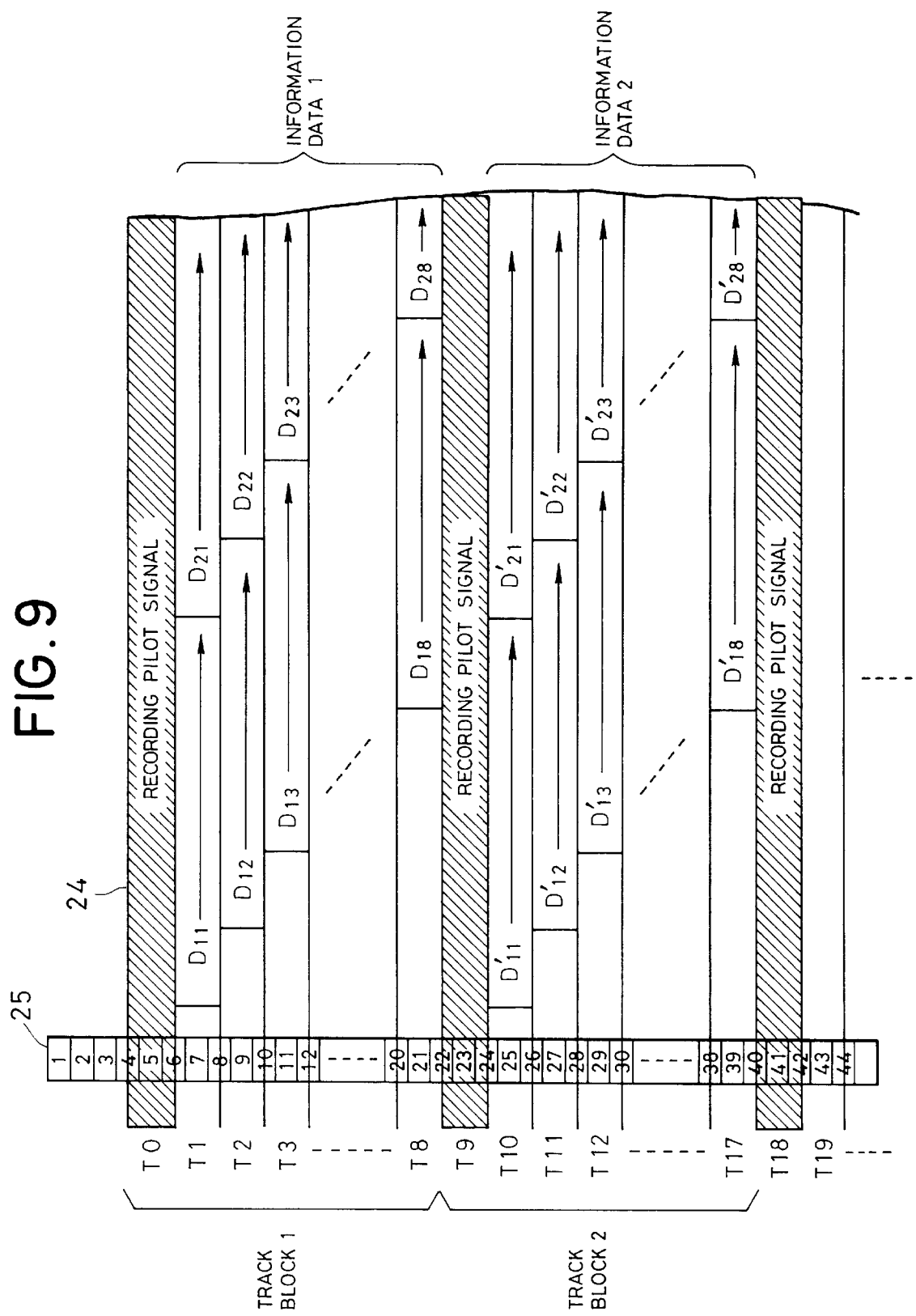
FIG. 9 is a timing diagram for explaining an information reading operation in the information recording/reproducing apparatus of FIG. 2.

FIG. 9 illustrates an exemplary recording form in which different information data 1, 2 are recorded on track blocks 1, 2, respectively.

In FIG. 9, a pilot signal is recorded on a track T0 belonging to the track block 1, while information data 1 is distributively recorded on respective tracks T1–T8 belonging to the track block 1. Also, a pilot signal is recorded on a track T9 belonging to the track block 2, while information data 2 is distributively recorded on respective tracks T10–T17 belonging to the track block 2. It should be noted that the two pilot signals need not be at the same frequency as each other.

In an embodiment illustrated in FIG. 9, a read operation for reading the information data 1 is similar to that previously described in connection with the aforementioned FIG. 5.

On the other hand, the information data 2 is read by operations as follows.

In a state illustrated in FIG. 9, three heads $MR_{22}$–$MR_{24}$ in the reproducing head assembly 25 are ready to trace the track T9 on which the pilot signal corresponding to the information data 2 is recorded.

Therefore, as the operation flow illustrated in the aforementioned FIG. 7 is executed to read the information data 2 in this state, the selector 29 sequentially selects signals from heads having every other numbers from a head $MR_{25}$, i.e., head $MR_{27}$, head $MR_{29}$, . . . , head $MR_{39}$, as read signal from the respective tracks T1–T8, and supplies the amplifier AP with these signals.

Stated another way, while the information data 2 is actually recorded on the tracks T10–T17 on the magnetic tape 24, these tracks are determined to be tracks T1–T8 as the information data 2.

Thus, since the tracks are determined based on the detection of the pilot signal for each track block, recorded information can be favorably read even if the magnetic tape 24 is expanded or contracted in the tape width direction.

While the foregoing embodiment determines which of tracks on the magnetic tape 24 each of read signal read by each of the heads $MR_1$–$MR_m$ is read from to select a read signal corresponding to each track to provide a final read signal, the present invention is not limited to this particular configuration.

For example, as an alternative configuration, a final read signal may be provided by a weighting operation using each of read signals from a plurality of adjacent tracks in order to improve the S/N ratio.

Figure 10:
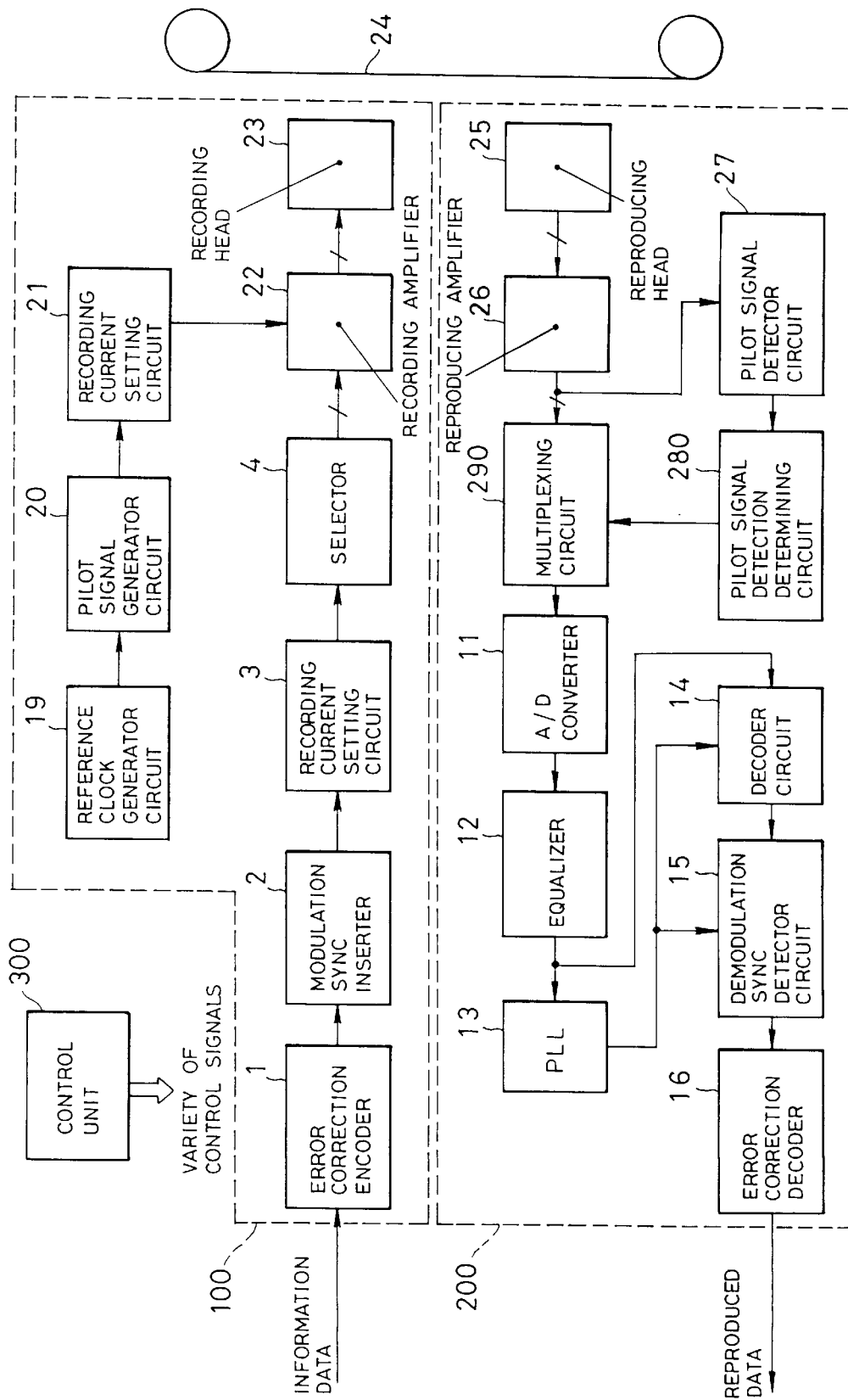
FIG. 10 is a block diagram illustrating the configuration of an information recording/reproducing apparatus according to a second embodiment of the present invention.

FIG. 10 is a block diagram illustrating the configuration of an information recording/reproducing apparatus according to another embodiment of the present invention which has been made in view of the alternative configuration mentioned above. Generally, the embodiment illustrated in FIG. 10 employs a pilot signal detection determining circuit 280 in place of the track determining circuit 28 in the information recording/reproducing apparatus of FIG. 2, and employs a multiplexing circuit 290 in place of the selector 29 in FIG. 2.

Figure 11:
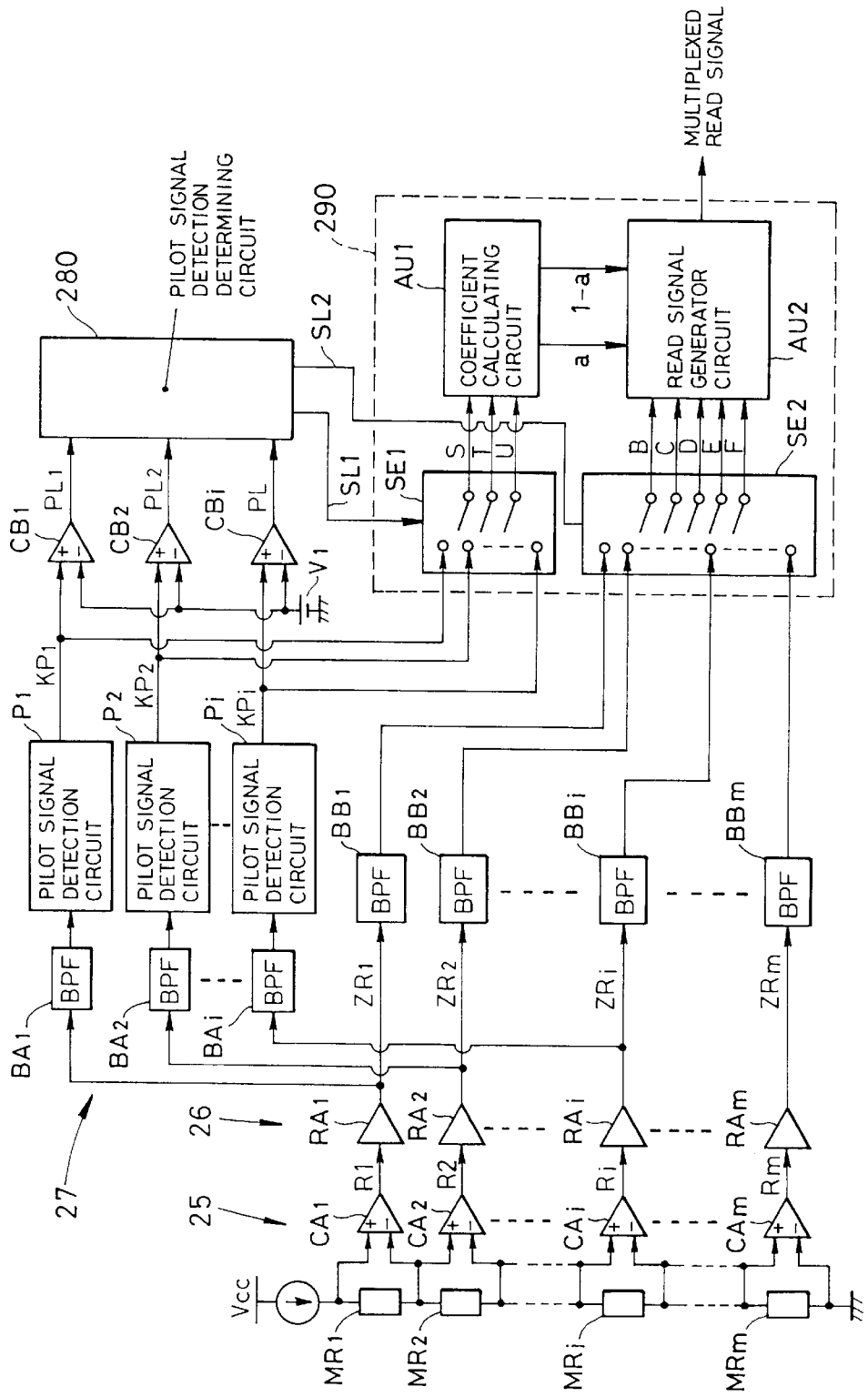
FIG. 11 is a block diagram illustrating exemplary configurations of a reproducing head assembly 25, a reproducing amplifier unit 26, a pilot signal detector circuit 27, a pilot signal detection determining circuit 280 and a multiplexing circuit 290 in FIG. 10.

Since the rest of configuration except for the abovementioned replacements is the same as the configuration illustrated in FIG. 2, the following description will be centered on operations of the pilot signal detection determining circuit 280 and the multiplexing circuit 290. FIG. 11 is a block diagram illustrating exemplary configurations of a reproducing head assembly 25, a reproducing amplifier unit 26, a pilot signal detector circuit 27, the pilot signal detection determining circuit 280 and the multiplexing circuit 290 in the information recording/reproducing apparatus illustrated in FIG. 10.

Figure 12:
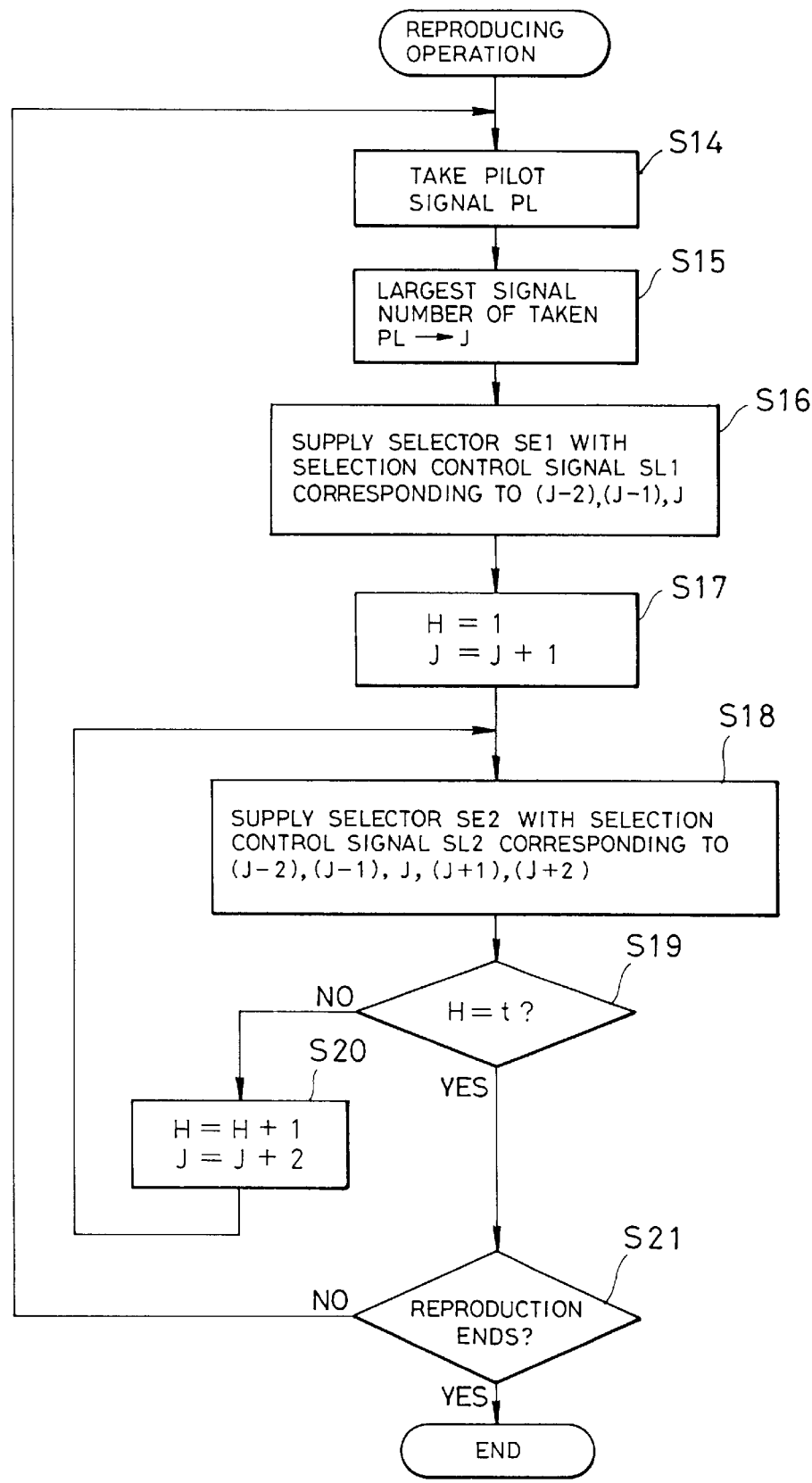
FIG. 12 is a flow diagram representing an operation flow of the pilot signal detection determining circuit 280 during a reproducing operation of the information recording/reproducing apparatus of FIG. 10.

FIG. 12 is a flow diagram representing an operation flow of the pilot signal detection determining circuit 280 during a reproducing operation.

Referring specifically to FIG. 12, the pilot signal detection determining circuit 280 first selects all signal numbers of pilot detecting signals PL, which have a signal logical value at "1," from pilot detecting signals PL1–PLi supplied from respective comparators $CB_1$–$CB_i$ in the pilot signal detector circuit 27 (step S14). For example, in the embodiment illustrated in FIG. 9, heads $MR_{21}$–$MR_{23}$ in the reproducing head assembly 25 read the pilot signal recorded on the track T9, so that signal numbers "21"–"23" are selected from signal numbers of pilot detecting signals $PL_1$–$PL_i$.

Next, the pilot signal detection determining circuit 280 discriminates the largest signal number J from the selected signal numbers (step S15). Then, the pilot signal detection determining circuit 280 supplies a selector SE1 of the multiplexing circuit 290 with a selection control signal SL1 to force the selector SE1 to select three detection signals corresponding to the signal number J, a signal number (J−1) and a signal number (J−2), respectively, from detection signals $KP_1$–$KP_i$ (step S16). It should be noted that the detection signals $KP_1$–$KP_i$ are those produced by the associated pilot signal detection circuits $P_1$–$P_i$ which detect the pilot signal for read signal read by the respective heads $MR_1$–$MR_i$. In this event, the detection signals $KP_1$–$KP_i$ correspond to signal levels of the pilot signals existing in the respective read signals read by the associated heads $MR_1$–$MR_i$.

In response to the execution of step S16 as described above, the selector SE1 of the multiplexing circuit 290 selects three detection signals indicated by the selection control signal SL1 from the detection signals $KP_1$–$KP_i$ supplied from the respective pilot signal detection circuits $P_1$–$P_i$, and supplies a coefficient calculating circuit AU1 with the three detection signals as read pilot levels S, T, U. Specifically, the selector SE1 supplies the coefficient calculating circuit AU1 with a detection signal corresponding to the signal number (J−2) as the read pilot level S; a detection signal corresponding to the signal number (J−1) as the read pilot level T; and a detection signal corresponding to the signal number J as the read pilot level U, respectively.

For example, in a state illustrated in FIG. 9, since the heads $MR_{22}$–$MR_{24}$ in the reproducing head assembly 25 respectively read the pilot signal recorded on the track T9, the signal number J is equal to "24" (J=24); the signal number (J−1) is equal to "23" ((J−1)=23); and the signal number (J−2) is equal to "22" ((J−2)=22). Thus, detection signals $KP_{22}$, $KP_{23}$, $KP_{24}$ corresponding to these signal numbers "22," "23," "24" are respectively supplied to the coefficient calculating circuit AU1 as the read pilot levels S, T, U.

It should be noted that the pilot signal has a relatively long wavelength so that much crosstalk is present with respect to adjacent tracks.

Thus, assuming that the value of the read pilot level T is "P", a proportion of crosstalk is b, and proportions of the information reading faces of the heads $MR_{22}$, $MR_{24}$ tracing the track on which the pilot signal is recorded are a and (1−a), respectively, the following relationship is established:

$$S=aP+bP$$

$$T=P$$

$$U=(1-a)P+bP$$

The coefficient calculating circuit AU1 calculates the above mentioned "a" and "(1−a)," respectively, based on the read pilot levels S, T, U, and supplies a read signal generator circuit AU2 with these coefficients.

FIG. 13 illustrates the internal configuration of the coefficient calculating circuit AU1.

As illustrated in FIG. 13, the coefficient calculating circuit AU1 performs the following calculation to derive a calculation result a by a configuration comprising an adder/subtractor AD1, a divider W1 and a multiplier M1:

$$a=(S+T-U)/2T$$

Also, the coefficient calculating circuit AU1 performs the following calculation to derive a calculation result (1−a) by a configuration comprising an adder/subtractor AD2, a divider W2 and a multiplier M2:

$$(1-a)=(-S+T+U)/2T$$

Next, the pilot signal detection determining circuit 280 increments the value of the signal number J by one, and sets "1" as an initial read track number H (step S17).

Then, the pilot signal detection determining circuit 280 supplies the selector SE2 of the multiplexing circuit 290 with a selection control signal SL2 for selecting five signals corresponding to the above-mentioned signal number (J−2), signal number (J−1), signal number J, signal number (J+1) and signal number (J+2), respectively, from signals supplied from the bandpass filters $BB_1$–$BB_m$ (step S18). In response to the execution of step S18, the selector SE2 selects five signals corresponding to the above-mentioned signal number (J−2), signal number (J−1), signal number J, signal number (J+1) and signal number (J+2), respectively, from signals supplied from the bandpass filters $BB_1$–$BB_m$, and supplies the read signal generator circuit AU2 with these signals as read signals B, C, D, E, F, respectively.

Figure 14:
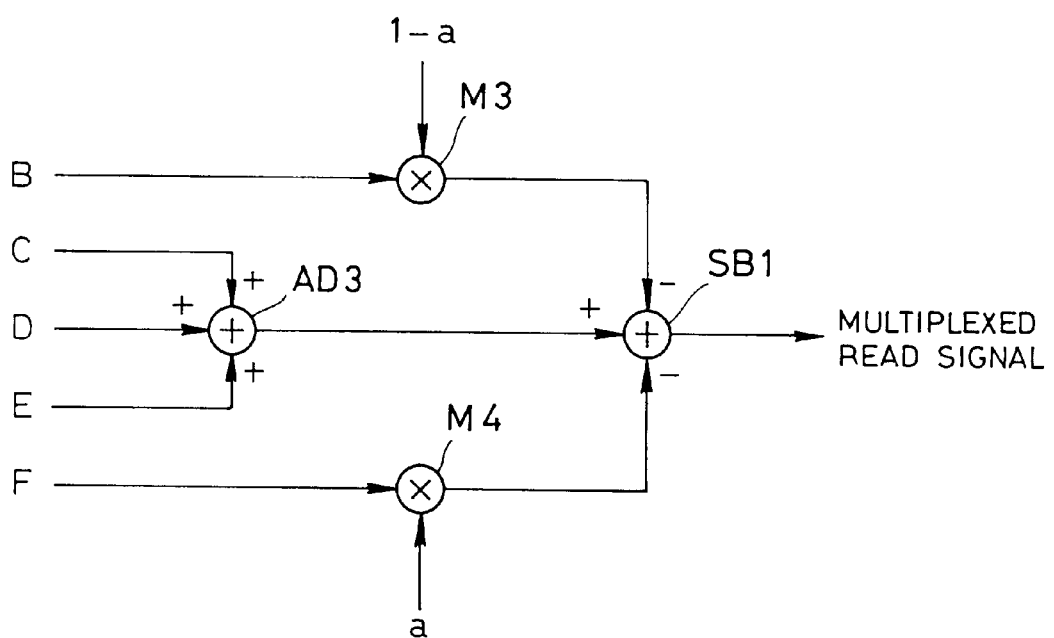
FIG. 14 is a schematic circuit diagram illustrating the internal configuration of a coefficient calculating circuit AU2 in FIG. 10.

FIG. 14 illustrates the internal configuration of the coefficient calculating circuit AU2.

As illustrated in FIG. 14, the coefficient calculating circuit AU2 performs the following calculation by a configuration comprising an adder AD3, multipliers M3, M4, and a subtractor SB1:

Time Division Multiplexed Read Signal=

$$C+D+E-(1-a)B-aF$$

and supplies the A/D converter 11 in FIG. 10 with the derived signal as a time division multiplexed read signal.

Next, the pilot signal detection determining circuit 280 determines whether or not a read track number indicated by the read track number H is equal to "t" (step S19). The value "t" indicates the number of tracks formed in one track blocks. If it is determined at step S19 that the read track number H is not equal to "t," the pilot signal detection determining circuit 280 increments the signal number J by two, and increments the read track number H by one (step S20). After the execution of step S20, the pilot signal detection determining circuit 280 returns to the execution of the aforementioned step S18. On the other hand, if it is determined at step S19 that the read track number H is equal to "t," the pilot signal detection determining circuit 280 determines whether or not a reproducing operation end instruction has been issued from the control unit 300 illustrated in FIG. 10 (step S21). If it is determined at step S21 that no reproducing operation end instruction has been issued, the pilot signal detection determining circuit 280 returns to the execution of the aforementioned step S14. On the other hand, if it is determined at step S21 that the reproducing operation end instruction has been issued, the pilot signal detection determining circuit 280 exits this operation flow, and terminates the operation.

In the following, the operations performed under the control represented by FIG. 12 will be explained with reference to FIG. 15.

Figure 15:
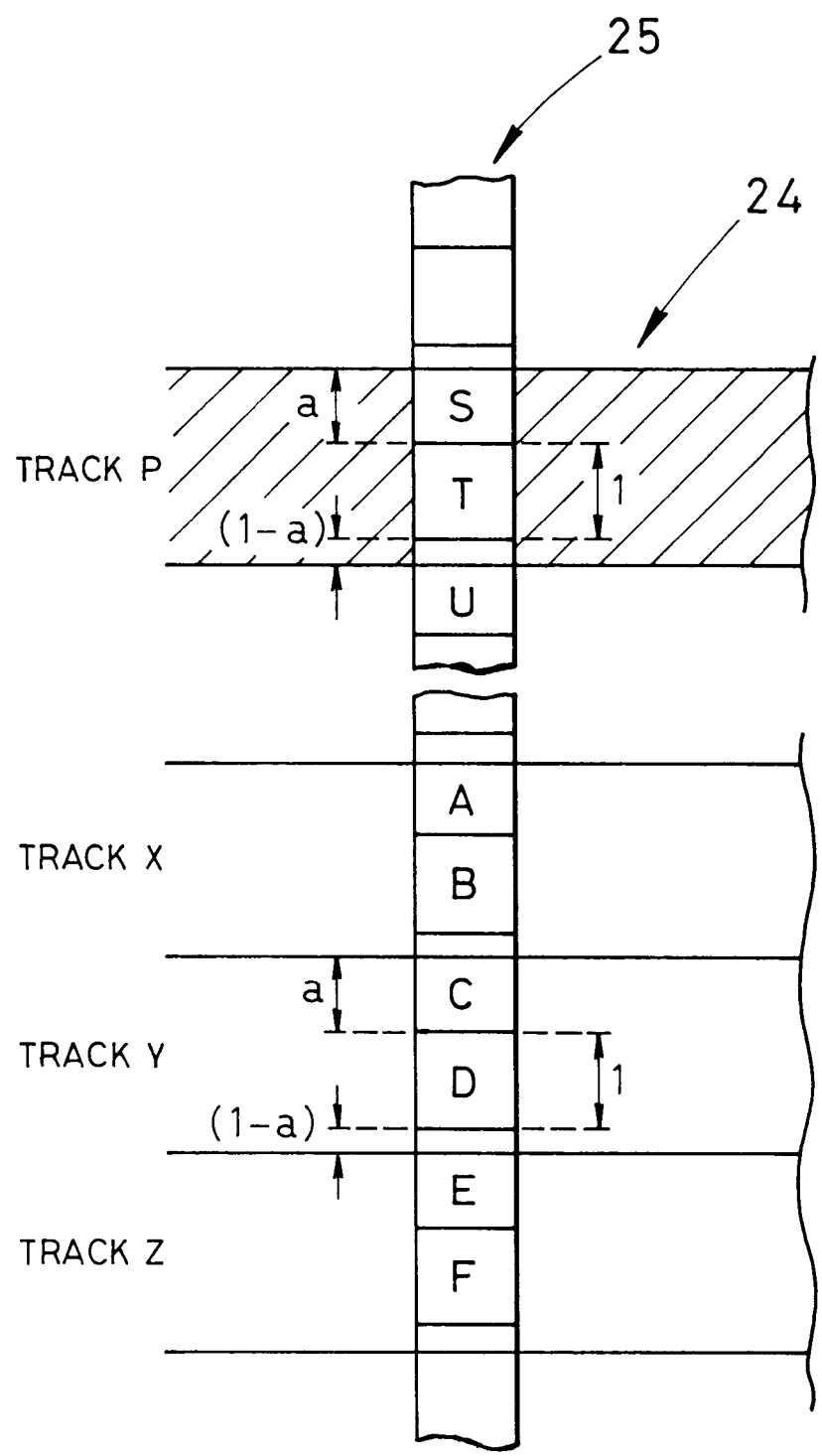
FIG. 15 is a diagram for explaining the operation performed/by the operation flow represented in FIG. 12.

As illustrated in FIG. 15, assuming that each head in the reproducing head assembly 25 has a width (which is a width in the tape width direction of the magnetic tape 24) is equal to one half of each track width, three mutually adjacent heads trace one track. In this event, the central head within the three heads reads recorded information only from a traced track, while the heads on both sides of the central head read information from both this track and respective adjacent tracks.

For example, a head D in the reproducing head assembly 25 illustrated in FIG. 15 reads recorded information from a track Y, and provides a read signal D:

$$D=RY$$

A head C adjacent to the head D on one side reads information from this track Y and a track X, respectively, in a ratio of a:(1−a) to provide a read signal C:

$$C=aRY+(1-a)RX$$

Also, a head E adjacent to the head D on the other side reads information from the track Y and a track Z, respectively, in a ratio of a:(1−a) to provide a read signal E:

$$E=(1-a)RY+aRZ$$

Thus, adding the read signals read by the three heads C E, the following result is derived:

$$C+D+E=2RY+(1-a)RX+aRZ$$

In this event, since RX is a read signal read by a head B in FIG. 15, and RZ is a read signal read by a head F, the above equation may be modified to:

$$C+D+E=2RY+(1-a)B+aF$$

Thus, $$2RY=C+D+E-(1-a)B-aF$$

can be derived.

This calculation is performed in the read signal generator circuit AU2 illustrated in FIG. 11. The read signal generator circuit AU2 outputs this 2RY derived by the above calculation as a time division multiplexed read signal as mentioned above.

It should be noted that (1−a) and a in the equation are derived based on the pilot signal which is read from the magnetic tape 24 and detected.

For example, in FIG. 15, heads which trace a track P on which a pilot signal as indicated by a hatched portion is recorded are a head S, a head T and a head U. Since the pilot signal has a longer wavelength than information data, this causes crosstalk to adjacent tracks. Thus, assuming that a proportion of such crosstalk is represented by b, a resulting pilot signal component S read by the head S and detected is expressed by:

$$S=aP+bP$$

Similarly, a pilot signal component T produced by the head T is expressed by:

$$T=P$$

Further, a pilot signal component U produced by the head U is expressed by:

$$U=(1-a)P+bP$$

From these equations, a and (1−a) can be derived as follows:

$$a=(S+T-U)/2T$$

$$(1-a)=(-S+T+U)/2T$$

The calculations for deriving a and (1−a) are performed in the coefficient calculating circuit AU1 illustrated in FIG. 11, as described above.

It will now be appreciated from the foregoing that in the configuration illustrated in FIG. 11, a read signal to be read from one track is produced based on read signals read by five mutually adjacent heads, so that an improved S/N ratio can be provided.

While FIGS. 11 and 6 have illustrated an embodiment in which the width of the respective reproducing heads is chosen to be one half of the track width, the present invention is not limited to this particularly sized heads.

Figure 16:
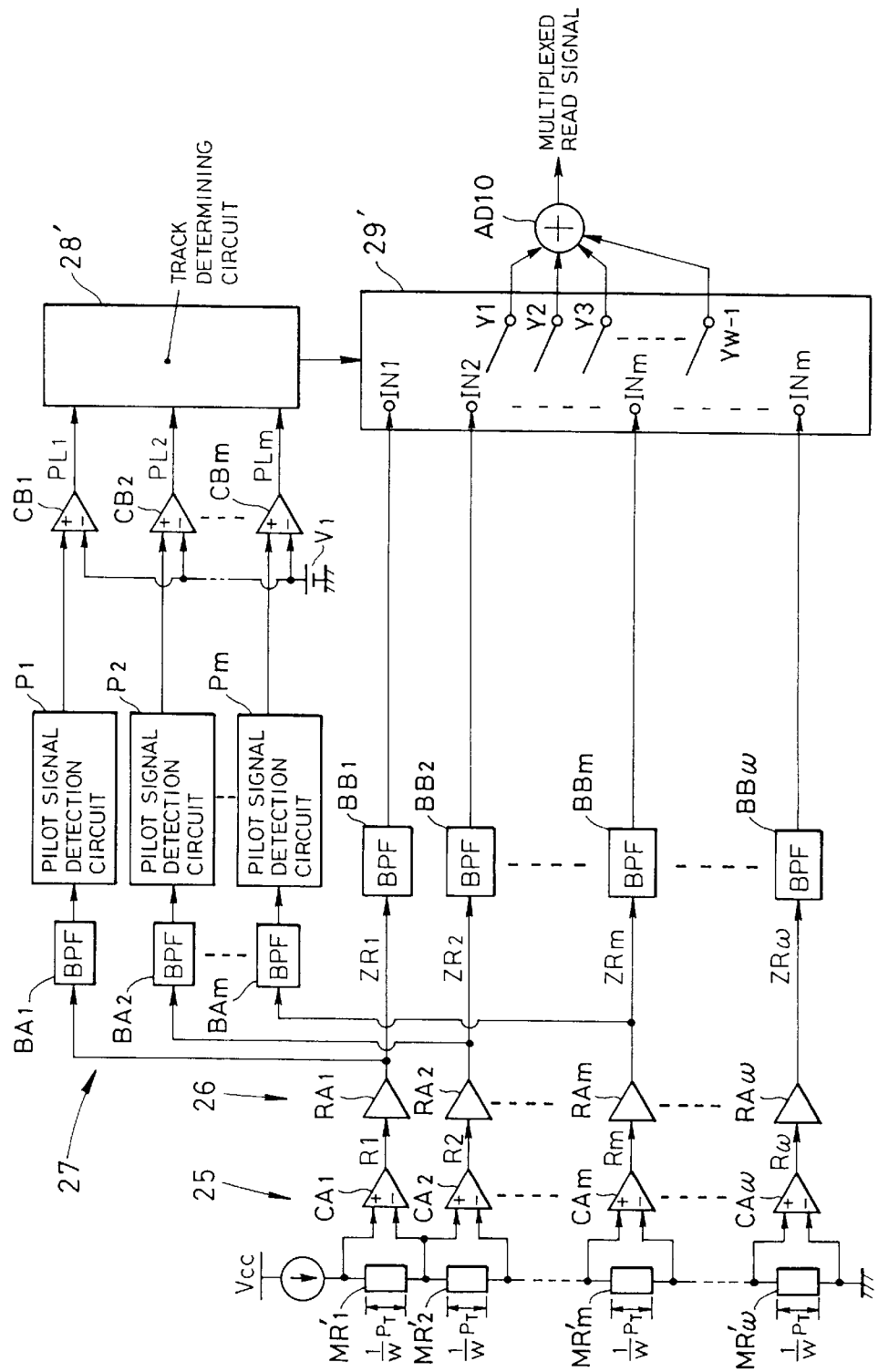
FIG. 16 is a block diagram illustrating the configuration including a reproducing head assembly 25, a reproducing amplifier unit 26, a pilot signal detector circuit 27, a track determining circuit 28' and a selector 29' as a third embodiment according to the present invention.

FIG. 16 is a block diagram illustrating an exemplary configuration including a reproducing head assembly 25, a reproducing amplifier unit 26, a pilot signal detector circuit 27, a track determining circuit 28' and a selector 29' when each reproducing head has a width chosen to be 1/w (w is a natural number equal to or more than two) as much as the track width.

Referring specifically to FIG. 16, the reproducing head assembly 25 is provided with ω reproducing heads $MR'_1-MR'_\omega$. Heads $MR'_1-MR_\omega'$ each have a width 1/w as much as a track width PT of respective tracks formed on a magnetic tape 24 as illustrated in FIG. 3, and are lined up in the tape width direction adjacent to each other. In other words, w heads MR' are lined up within the width of one track.

Differential amplifiers $CA_1$–$CA_\omega$ disposed in the reproducing head assembly 25 each produce a voltage difference of an output of associated heads $MR'_1$–$MR'_6$, and supply associated amplifiers $RA_1$–$RA_\omega$ in the reproducing amplifier unit 26 with the voltage differences as read signals $R_1$–$R_\omega$. Each of the amplifiers $RA_1$–$RA_\omega$ amplifies the supplied read signal $R_1$–$R_\omega$ as desired, and produces an amplified read signal $ZR_1$–$ZR_\omega$. Each of bandpass filters $BB_1$–$BB_\omega$ extracts a signal in an information band from associated one of the amplified read signals $ZR_1$–$ZR_\omega$, and supplies the selector 29' with the extracted signal as read information data signals at an associated input terminal $IN_1$–$IN_\omega$.

It should be noted that the operation of the illustrated pilot signal detector circuit 27 comprising bandpass filters $BA_1$–$BA_i$, pilot signal detection circuit $P_1$–$P_i$ and comparators $CB_1$–$CB_i$ is identical to that illustrated in FIG. 6, so that detailed description thereon is omitted.

The pilot signal detector circuit 27 detects the pilot signal for the respective read signals $R_1$–$R_i$ to produce pilot detecting signals $PL_1$–$PL_i$ which are supplied to the track determining circuit 28'.

The track determining circuit 28' determines based on a signal logical value of each of the pilot detecting signals $PL_1$–$PL_i$ whether or not each of the heads $MR'_1$–$MR_\omega'$ has read any of tracks T0–Tn on a magnetic tape as illustrated in FIG. 3. The track determining circuit 28' generates a selection control signal in accordance with this determination result, and supplies the selector 29' with the selection control signal.

The selector 29' selects (w−1) from information data signals at the input terminals IN1–INω in accordance with the selection control signal supplied from the track determining circuit 28, and supplies an adder AD10 with the selected signals. The value w indicates the number of heads arranged within one track pitch, as has been noted above. The adder AD10 adds the (W−1) signals selected by the selector 29' to derive a sum signal which is supplied to the A/D converter 11 illustrated in FIG. 2 as a time division multiplexed read signal.

Next, the operations of the track determination circuit 28' and the selector 29' will be explained with reference to an example illustrated in FIG. 17.

Figure 17:
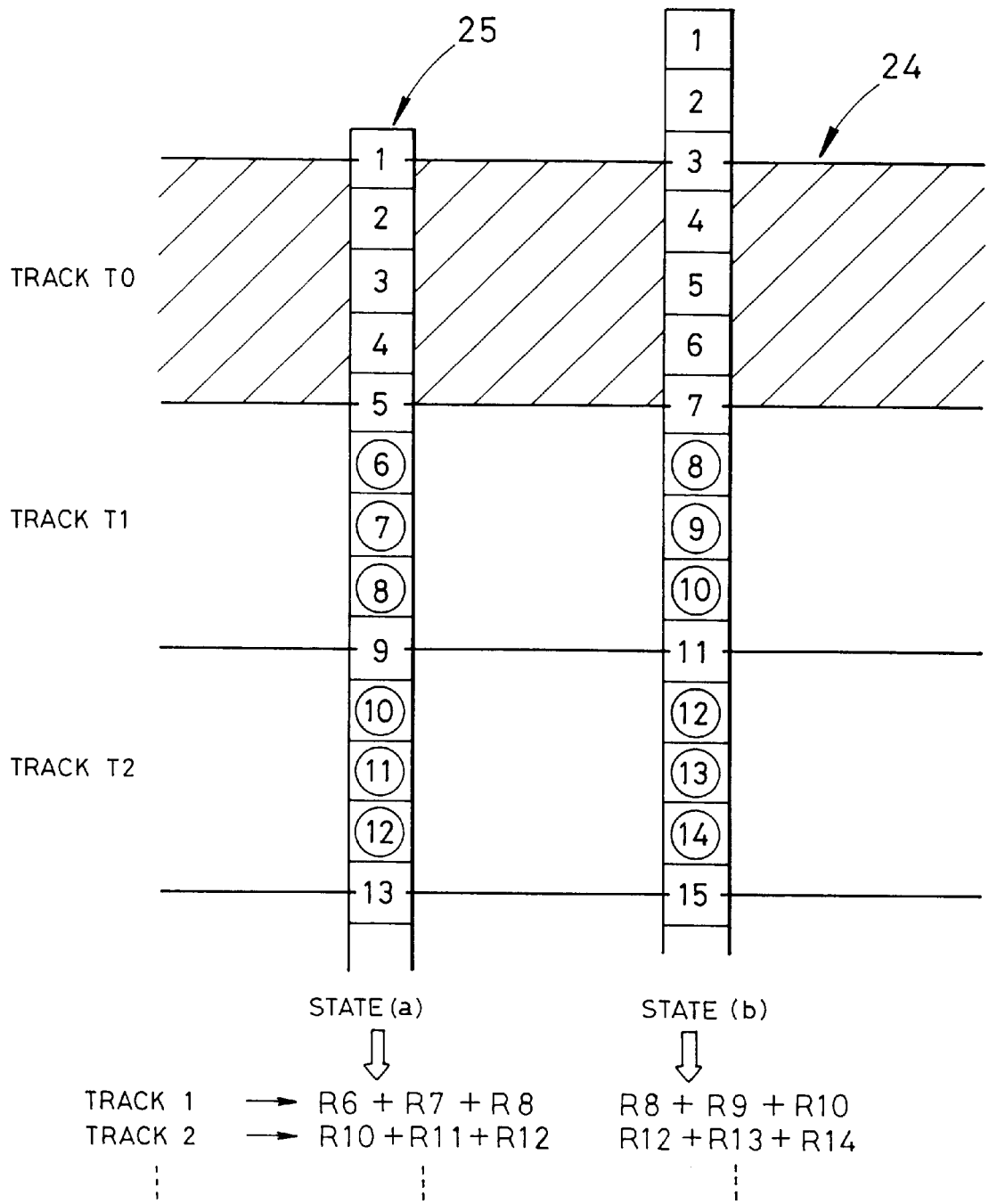
FIG. 17 is a diagram for explaining operations of a track determining circuit 28' and a selector 29' in FIG. 16.

FIG. 17 illustrates an example in which each of the heads MR' in the reproducing head assembly 25 has a width chosen to be one quarter of the track width of each track formed on the magnetic tape 24. Therefore, in this case, the value w is equal to four (w=4), so that the selector 29' selects (w−1), i.e., three information data signals from those existing at the input terminals $IN1$–$IN_\omega$ and supplies the adder AD10 with the three selected information data signals.

Explanation will first given of the case where a state (a) in FIG. 17 is established in a relative positional relationship between the respective tracks and the reproducing head assembly 25.

In the state (a), heads $MR'^{-1}$–$MR'_5$ in the reproducing head assembly 25 are ready to trace the track T0 on which a pilot signal as indicated by a hatched portion is recorded.

In this event, the pilot signal detector circuit 27 supplies the track determining circuit 28' with each of pilot detecting signals $PL_1$–$PL_5$ each at logical value "1."

The track determining circuit 281 adds one to "5," which is the largest value of signal numbers "1"–"5" of the pilot detecting signals PL1–PL5 to derive "6" as an initial signal number SN. Then, the track determining circuit 28' supplies the selector 29' with a selection control signal for forcing the selector 29' to select input terminals IN6–IN8 corresponding to three successive signal numbers "6"–"8" including "6" as the initial signal number SN. The selector 29' selects read information data signals supplied to the respective input terminals IN6–IN8 from the input terminals IN1–IN in accordance with the selection control signal, and supplies the adder AD10 with the selected signals simultaneously. The adder AD10 adds the three read information data signals supplied thereto from the selector 29' and outputs the sum as a time division multiplexed read signal read from the track T1. Next, the track determining circuit 28' adds "4" to "6" as the initial signal number SN to derive a signal number "10." Then, the track determining circuit 28' supplies the selector 29' with a selection control signal for forcing the selector 29' to select read information data signals supplied to the respective input terminals IN10–IN12 corresponding to three successive signal numbers "10"–"12" including "10." The selector 29' selects read information data signal supplied to the respective input terminals IN10–IN12 from the input terminals IN1–IN in accordance with the selection control signal, and supplies the adder AD10 with the selected signals simultaneously. The adder AD10 adds the three read information data signals supplied thereto from the selector 29' and outputs the sum as a time division multiplexed read signal from the track T2. Subsequently, three read information data signals supplied to respective input terminals IN(2+4n)–IN(4+4n) of the selector 29' are likewise added to derive the sum which is output as a time division multiplexed signal read from a track Tn. In this way, time division multiplexed signals read from respective tracks are output in sequence.

Next, in the state (b) in FIG. 17, heads $MR'_3$–$MR'_7$ in the reproducing head assembly 25 are ready to trace the track T0 on which a pilot signal as indicated by a hatched portion is recorded.

In this event, the pilot signal detector circuit 27 supplies the track determining circuit 28' with each of pilot detecting signals PL3–PL7 each at logical value "1."

The track determining circuit 28' adds one to "7," which is the largest value of signal numbers "3"–"7" of the pilot detecting signals PL3–PL7 to derive "8" as an initial signal number SN. Then, the track determining circuit 28' supplies the selector 29' with a selection control signal for forcing the selector 29' to select input terminals IN8–IN10 corresponding to three successive signal numbers "8"–"10" including "8" as the initial signal number SN. The selector 29' selects read information data signals supplied to the respective input terminals IN8–IN10 from the input terminals IN1–IN in accordance with the selection control signal, and supplies the adder AD10 with the selected signals simultaneously. The adder AD10 adds the three read information data signals supplied thereto from the selector 29' and outputs the sum as a time division multiplexed read signal read from the track T1. Next, the track determining circuit 28' adds "4" to "8" as the initial signal number SN to derive a signal number "12." Then, the track determining circuit 28' supplies the selector 29' with a selection control signal for forcing the selector 29' to select read information data signals supplied to the respective input terminals IN12–IN14 corresponding to three successive signal numbers "12"–"14" including the signal number "12." Then, the selector 29' selects read information data signal supplied to the input terminals IN12–IN14 from the input terminals IN1–IN in accordance with the selection control signal, and supplies the adder AD10 with the selected signals simultaneously. The adder AD10 adds the three read information data signal supplied thereto from the selector 29' and outputs the sum as a time division multiplexed read signal from the track T2. Subsequently, three read information data signals supplied to respective input terminals IN(4+4n)–IN(6+4n) of the selector 29' are likewise added to derive the sum which is output as a time division multiplexed signal read from a track Tn. In this way, time division multiplexed signals read from respective tracks are output in sequence.

Stated another way, the track determining circuit 28', the selector 29' and the adder AD10 illustrated in FIG. 16 produce a time division multiplexed read signal corresponding to a track Tn based on read information data signal read by each of (w−1) heads having head numbers h in a range expressed by the following equation within read information data signals from the respective heads $MR'_1$–$MR'_\omega$.

$$\{SN+(n-1)\cdot w\} \leq h \leq \{SN+w-2)+(n-1)\cdot w\}$$

where "SN" indicates an initial signal number which is calculated by adding one to the largest one of signal numbers of pilot detecting signals $PL_1$–$PL_i$ supplied to the track determining circuit 28' as described above.

Figure 18:
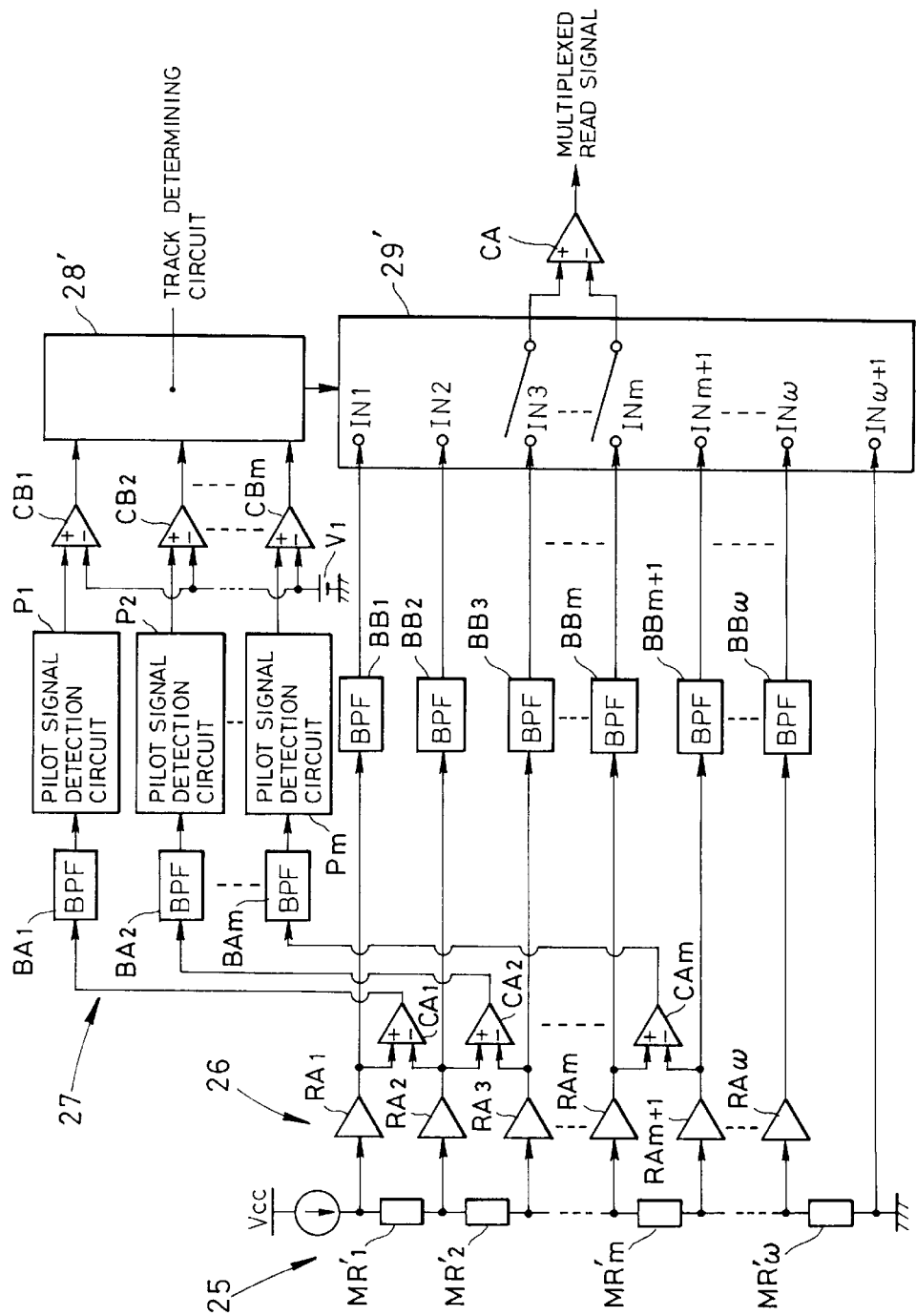
FIG. 18 is a block diagram illustrating the configuration of a fourth embodiment according to the present invention.

FIG. 18 illustrates an exemplary modification to the configuration illustrated in FIG. 16.

The embodiment illustrated in FIG. 18 additionally comprises a differential amplifier for taking a difference of terminal voltages of the respective heads $MR'_1$–$MR'_\omega$.

The configuration in FIG. 18 is such that the terminal voltages of the respective heads $MR'_1$–$MR'$ are directly supplied to the selector 29' through associated reproducing amplifiers $RA_1$–$RA_\omega$ and bandpass filters $BB_1$–$BB_\omega$, and the differential amplifier CA disposed behind the selector 29' picks up a difference. Also, differential amplifiers $CA_1$–$CA_m$ are disposed on signal lines input to the pilot signal detector circuit 27, as illustrated in FIG. 18.

In this configuration, the selector 29' selects an input terminal IN of a terminal number indicated by:

$$\{SN+(n-1)\cdot w\}$$

from the input terminals IN1–INω, and supplies a positive input terminal of the differential amplifier CA with a read information data signal present at the selected input terminal IN.

Also, the selector 29' selects an input terminal IN of a terminal number indicated by:

$$\{(SN+w-2)+(n-1)\cdot w\}$$

from the input terminals IN1–IN, and supplies a negative input terminal of the differential amplifier CA with a read information data signal present at the selected input terminal IN.

The differential amplifier CA takes a difference between the signals supplied to the positive input terminal and the negative input terminal, and outputs the resulting signal indicative of the difference as a time division multiplexed signal read from a track Tn.

According to the configuration described above, the number of differential amplifiers and the number of output terminals of the selector 29' can be reduced as compared with the configuration illustrated in FIG. 16.

It should be noted that the foregoing embodiment is applied under a condition that a track width of each track formed on a magnetic tape 24 is an integer multiple of the width of each head in the reproducing head assembly 25, and the multiple is previously known.

Figure 19:
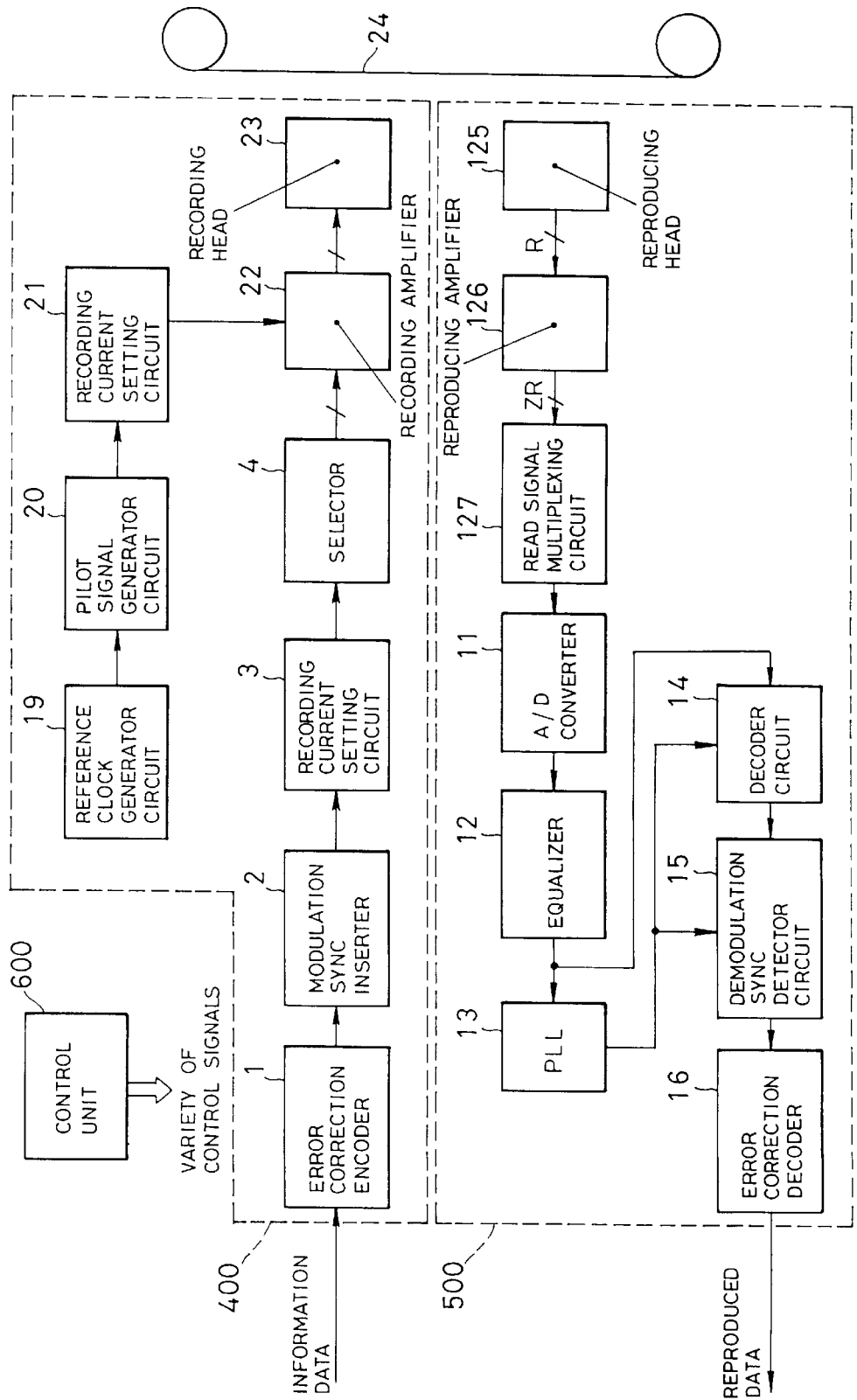
FIG. 19 is a block diagram illustrating the configuration of an information recording/reproducing apparatus as a fifth embodiment according to the present invention.

FIG. 19 is a block diagram illustrating an information recording/reproducing apparatus according to another embodiment of the present invention which is capable of reading recorded information from each track even if the above-mentioned condition is not satisfied.

The information recording/reproducing apparatus illustrated in FIG. 19 comprises a recording system 400 for recording information data on a magnetic tape 24 as a recording medium; a reproducing system 500 for reproducing recorded information from the magnetic tape 24; and a control unit 600 for generating a variety of control signals to control the recording system 400 and the reproducing system 500, respectively.

First, the recording system 400 will be described.

An error correction encoder 1 conducts error correction encoding processing on information data to be recorded using an error correcting code such as Reed-Solomon code, and supplies the resulting encoded information data to a modulation SYNC inserter 2. In this event, the information data is in the form of serial digital data. The modulation SYNC inserter 2 8–10 modulates the encoded information data supplied from the error correction encoder 1, adds a reference signal to each of frames in the 8–10 modulated information data, and supplies the resulting modulated data to a recording current setting circuit 3. The recording current setting circuit 3 generates a recording data signal for driving a recording head assembly 123, later described, with an optimal current value based on the modulated data, and supplies the recording data signal to a selector 4. The selector 4 has n output terminals so as to selectively output the recording data signal supplied from the recording current setting circuit 3 from any of these n output terminals.

A pilot signal generator circuit 20 generates a pilot signal at a predetermined frequency based on an oscillating signal generated by a reference clock generator circuit 19, and supplies the pilot signal to a recording current setting circuit 21. It should be noted that the pilot signal is a frequency signal having a wavelength approximately 10 to 50 times larger than that of the recording data signal. The recording current setting circuit 21 generates a recording pilot signal for driving the recording head assembly 123 with an optimal current value based on the pilot signal, and supplies the recording pilot signal to a recording amplifier unit 22. The recording amplifier unit 22 amplifies signals supplied from the respective n output terminals of the selector 4 and the recording pilot signal, respectively, as desired, and supplies the amplified signals to the recording head assembly 123.

Figure 20:
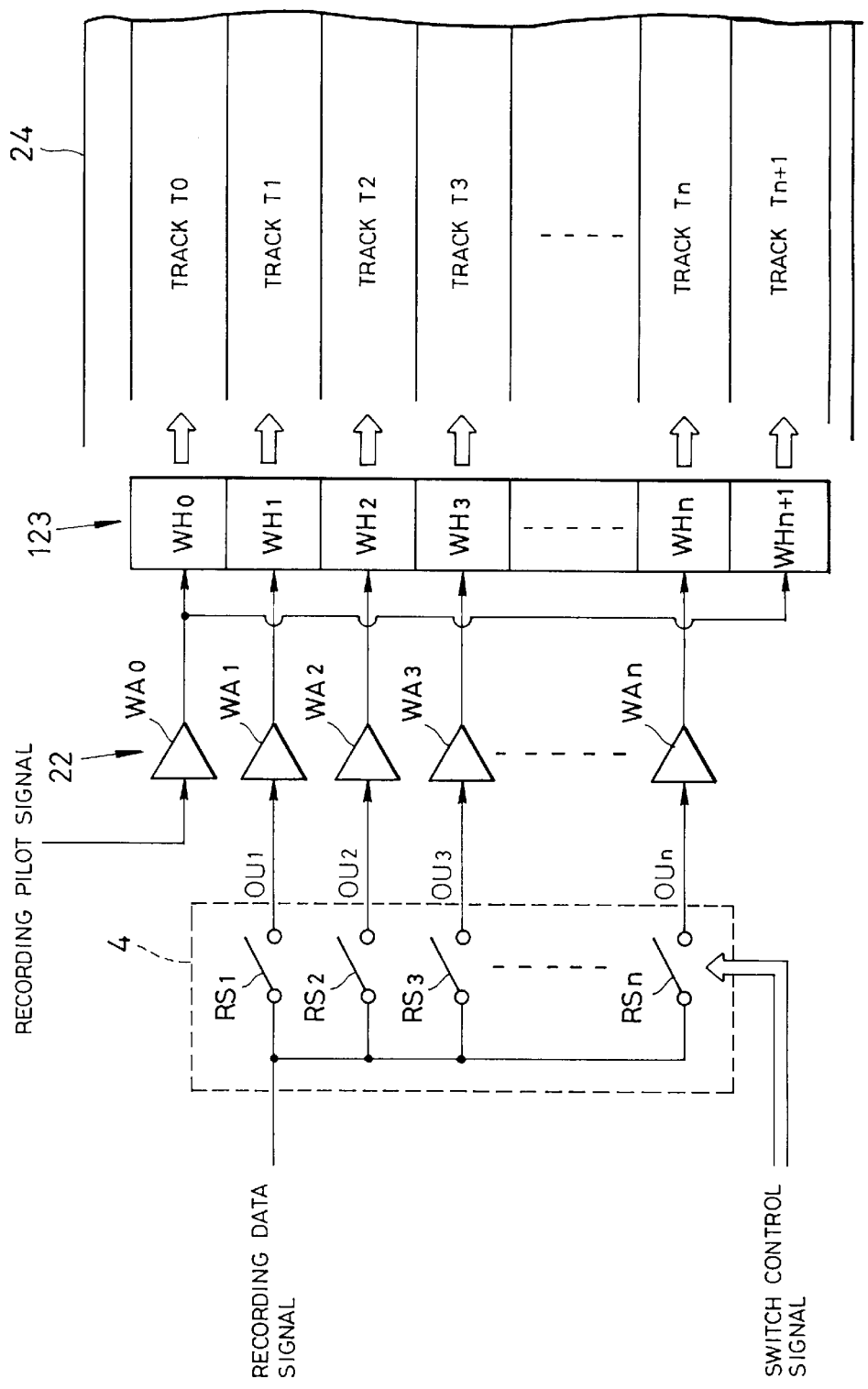
FIG. 20 illustrates in detail exemplary configurations of a selector 4, a recording amplifier unit 22 and a recording head assembly 123 illustrated in FIG. 19.

FIG. 20 illustrates in detail exemplary configurations of the above-mentioned selector 4, recording amplifier unit 22 and recording head assembly 123.

As illustrated in FIG. 20, the selector 4 comprises n switches $RS_1$–$RS_n$ for selectively outputting a recording data signal from the recording current setting circuit 3. Each of these switches $RS_1$–$RS_n$ is individually ON-OFF controlled in response to a switch control signal supplied from the control unit 600. Output terminals $OU_1$–$OU_n$ of the respective switches $RS_1$–$RS_n$ are connected to associated amplifiers $WA_1$–$WA_n$ as the recording amplifier unit 22. The amplifiers $WA_1$ $WA_n$ each amplify signals from the respective output terminals $OU_1$–$OU_n$ associated therewith as desired, and supplies associated magnetic heads $WH_1$–$WH_n$ in the recording head assembly 123 with the amplified signals. The magnetic heads $WH_1$–$WH_n$ record signals from the associated amplifiers $WA_1$–$WA_n$ on a magnetic tape 24 to form tracks T1–Tn on the magnetic tape 24, respectively.

A recording pilot signal from the recording current setting circuit 21 in turn is amplified by an amplifier $WA_0$ as desired, and supplied to magnetic heads $WH_0$, $WH_{n+1}$, respectively. The magnetic head $WH_0$ records the signal from the amplifier $WA_0$ on the magnetic tape 24 to form a track T0 on the magnetic tape 24. The magnetic head $WH_{n+1}$ in turn records the signal from the amplifier $WA_0$ on the magnetic tape 24 to form a track $T_{n+1}$ on the magnetic tape 24.

Figure 21:
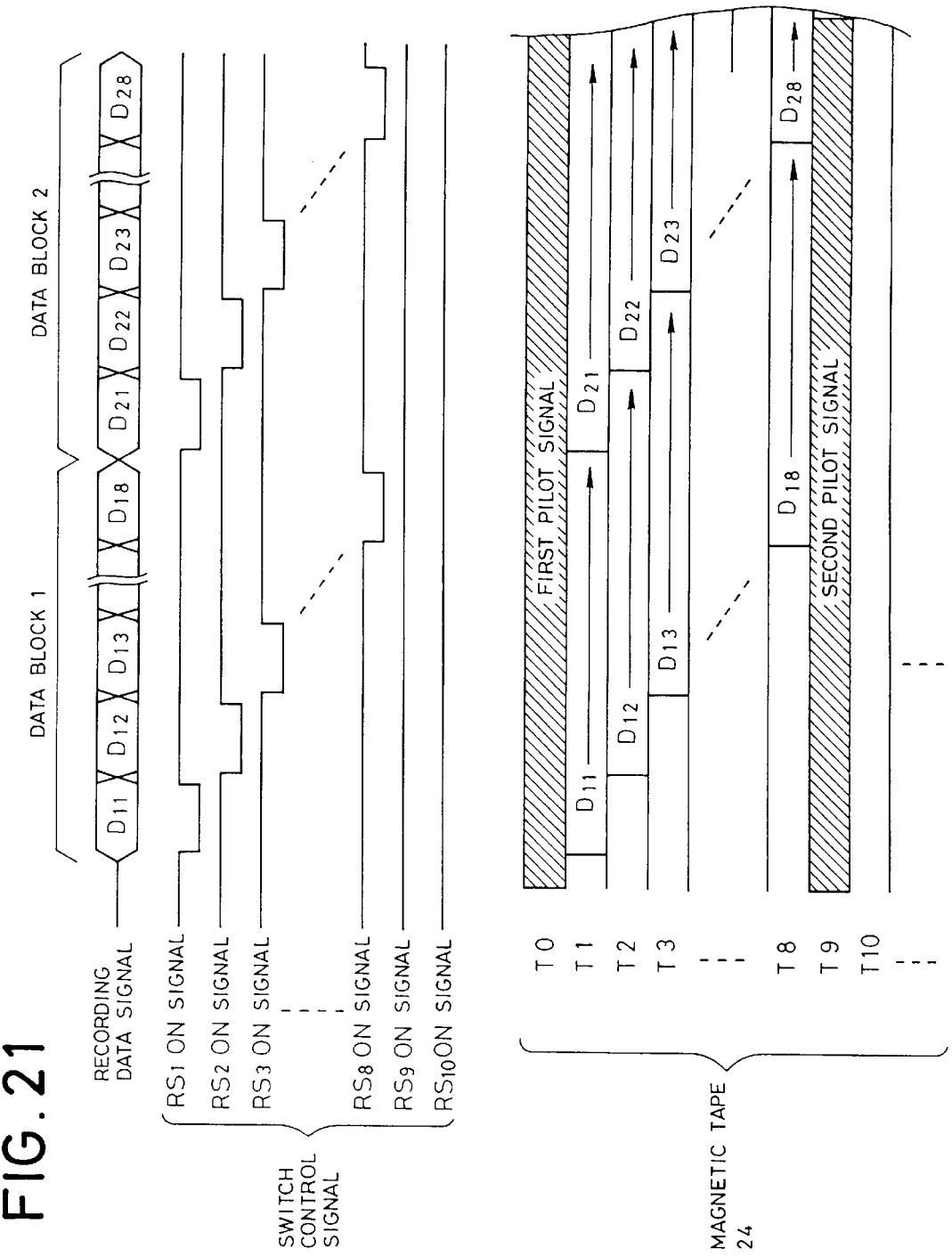
FIG. 21 is a timing diagram illustrating an example of a recording operation performed by a recording system 400 illustrated in FIG. 19.

FIG. 21 is a timing diagram illustrating an example of a recording operation performed by the recording system 400 as described above.

More specifically, FIG. 21 illustrates an exemplary operation for distributively recording a recording data signal having a data block length of 8 bits ($D_1$–$D_8$) on tracks T1–T8 on a magnetic tape 24.

As illustrated in FIG. 21, during a period in which a first bit $D_{11}$ in a data block 1 of a recording data signal is being supplied to the selector 4, the control unit 600 supplies the selector 4 with an $RS_1ON$ signal at logical value "0" as a switch control signal to turn ON the switch $RS_1$ of the selector 4. This operation causes the first bit $D_{11}$ in the data block 1 to be recorded on the track T1 on the magnetic tape 24.

Next, as a second bit $D_{12}$ in the data block 1 of the recording data signal is supplied to the selector 4, the control unit 600 supplies the selector 4 with an $RS_1ON$ signal at logical value "1" to return the switch $RS_1$ of the selector 4 to ON state. Simultaneously with this, while the second bit $D_{12}$ is being supplied, the control unit 600 supplies the selector 4 with an $RS_2ON$ signal at logical value "0" as a switch control signal to turn ON the switch $RS_2$ of the selector 4. This operation causes the second bit $D_{12}$ in the data block 1 to be recorded on the track T2 on the magnetic tape 24.

Next, as a third bit $D_{13}$ in the data block 1 of the recording data signal is supplied to the selector 4, the control unit 600 supplies the selector 4 with the $RS_2ON$ signal at logical value "1" to return the switch $RS_2$ of the selector 4 to OFF state. Simultaneously with this, while the third bit $D_{13}$ is being supplied, the control unit 600 supplies the selector 4 with a $RS_3ON$ signal at logical value "0" as a switch control signal to turn ON the switch $RS_3$ of the selector 4. This operation causes the third bit $D_{13}$ in the data block 1 to be recorded on the track T3 on the magnetic tape 24.

Subsequently, the switches $RS_3$–$RS_8$ of the selector 4 are sequentially turned ON in a similar way to record a fourth bit $D_{14}$ to an eighth bit $D_{18}$ in the data block 1 on the tracks T4–T8, respectively. As the eighth bit $D_{18}$ in the data block 1 has been supplied to the selector 4, a first bit $D_{21}$ in the next data block 2 is supplied to the selector 4. Then, the control unit 600 repetitively executes the operations as described above to record the first bit $D_{21}$ to an eighth bit $D_{28}$ in the data block 2 on the tracks T1–T8, respectively.

While the recording data signal is being recorded on the tracks T1–T8, a first pilot signal and a second pilot signal are recorded on the track T0 and the track T9, respectively, as indicated by hatchings in FIG. 21. It should be noted that these first pilot signal and second pilot signal need not be at the same frequency as each other.

Figure 22:
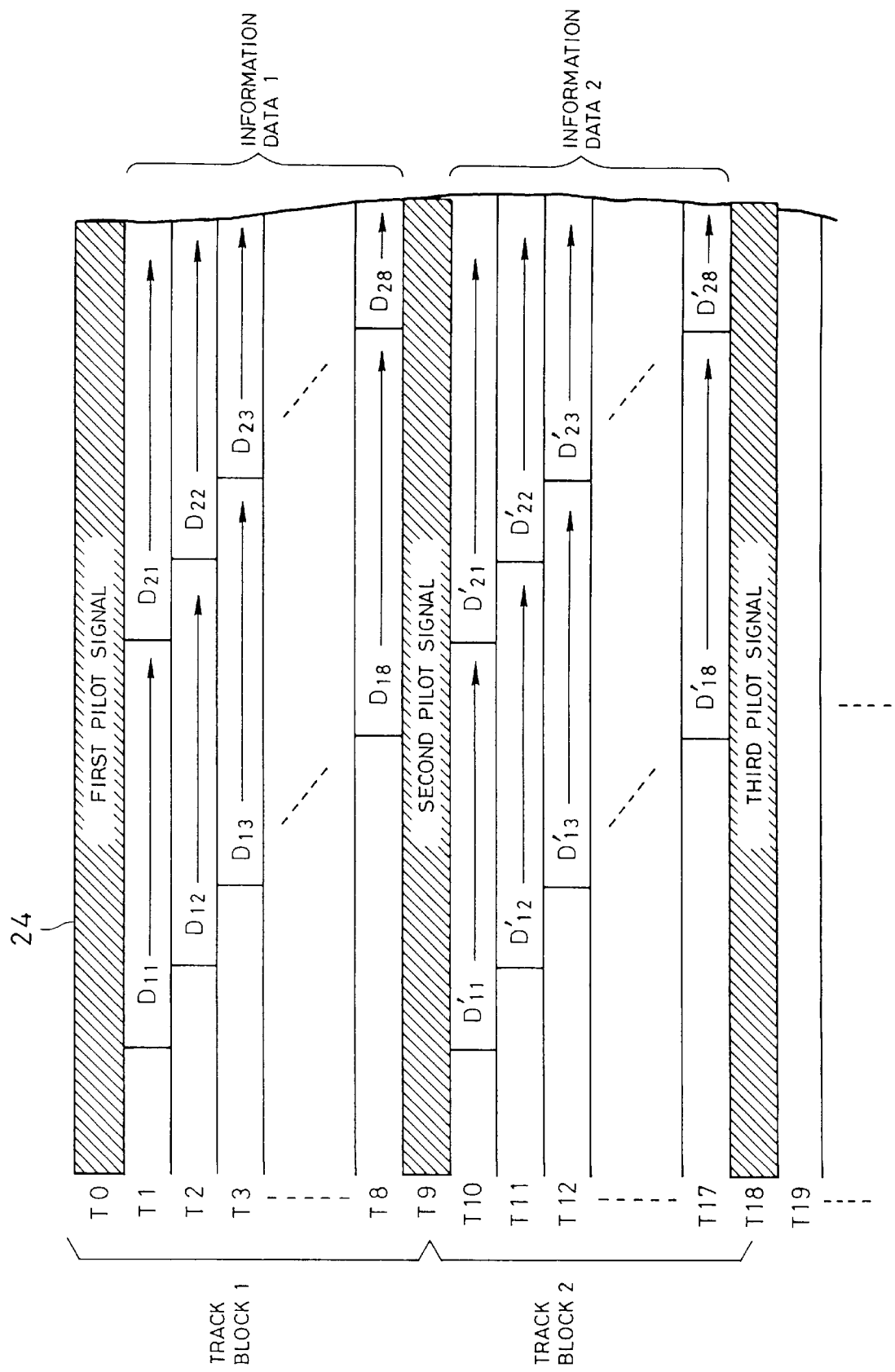
FIG. 22 is a timing diagram illustrating an exemplary recording form of the recording system 400 illustrated in FIG. 19.

Stated another way, the first and second pilot signals are recorded on tracks before and after a group of tracks on which a recording data signal is recorded. Alternatively, if recording data signals corresponding to a plurality of information data are recorded in different track blocks from each other, a track for recording a pilot signal thereon may be shared by the track blocks, as illustrated in FIG. 22. Next, a configuration for reproducing recorded information from a magnetic tape as mentioned above, i.e., the reproducing system 500 illustrated in the aforementioned FIG. 19 will be described with reference to FIG. 23.

Figure 23:
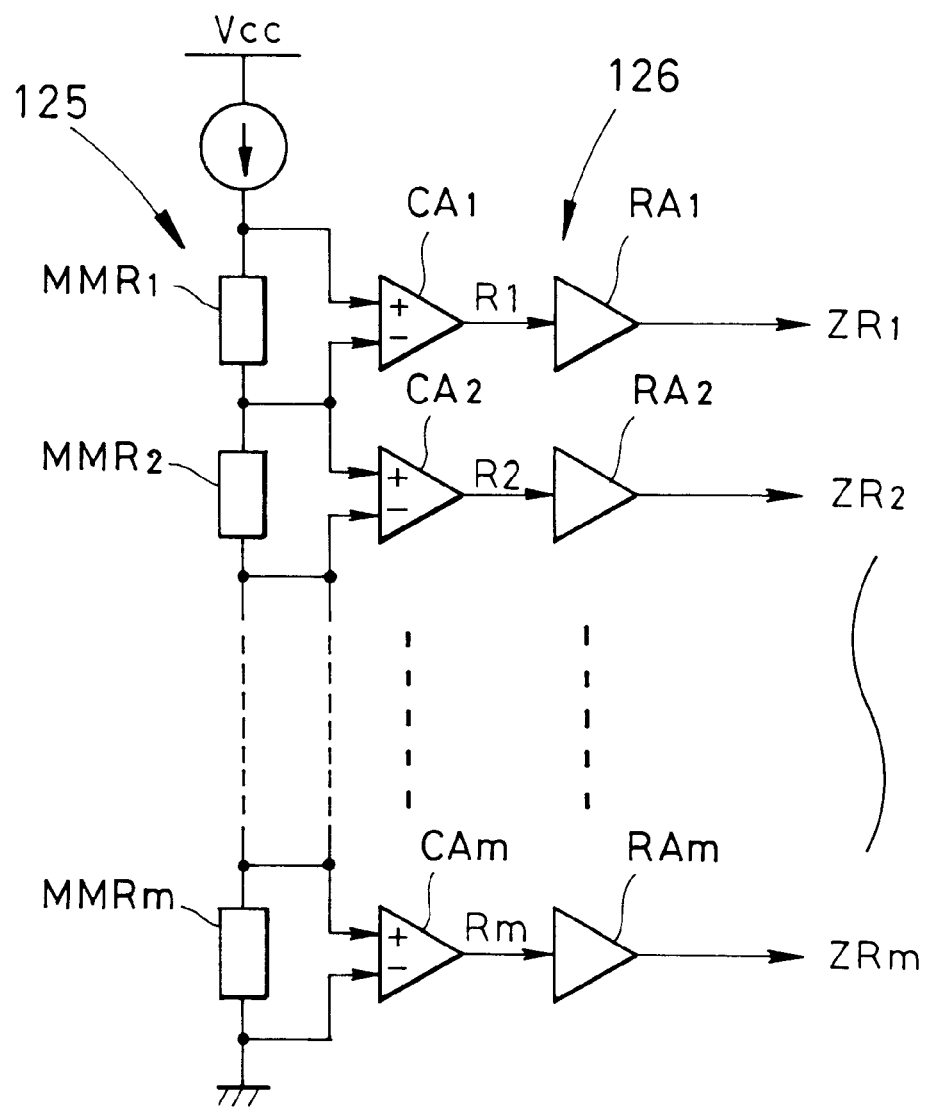
FIG. 23 a block diagram illustrating detailed configurations of a reproducing head assembly 125 and a reproducing amplifier 126 in a reproducing system 500 in FIG. 19.

FIG. 23 is a block diagram illustrating a detailed configuration of a reproducing head assembly 125 and a reproducing amplifier 126 in the reproducing system 500.

In FIG. 23, the reproducing head assembly 125 is provided with MR (magnetoresistive) type heads $MMR_1$–$MMR_m$ independent of each other and differential amplifiers $CA_1$–$CM_m$. The differential amplifiers $CA_1$–$CM_m$ each produce a voltage difference of outputs of associated heads $MMR_1$–$MMR_m$, and supply associated amplifiers $RA_1$–$RA_m$ as the reproducing amplifier 126 with the voltage differences as read signal $R_1$–$R_m$. Each of the amplifiers $RA_1$–$RA_m$ amplifies an associated read signal $R_1$–$R_m$ as desired, and produces an amplified read signal $ZR_1$–$ZR_m$ which are supplied to a read signal multiplexing circuit 127.

The read signal multiplexing circuit 127 produces a time division multiplexed read signal by performing a desired operation (later described) based on the amplified read signals $ZR_1$–$ZR_m$, and supplies an A/D converter 11 with the time division multiplexed read signal. The A/D converter 11 samples the time division multiplexed read signal to convert it into digital values which are supplied to an equalizer 12. The equalizer 12 waveform-equalizes the digital values to compensate for inter-symbol interference in the digital values, and supplies a PLL (Phase Locked Loop) circuit 13 with the resulting compensated digital values. The PLL circuit 13 generates, based on the compensated digital values, a reproducing clock signal which follows variations in frequency and phase of the read signals due to fluctuations in tape speed. A decoder circuit 14 performs a binary-value determination on the compensated digital values at the timing of the reproducing clock signal, and supplies the resulting binary values to a demodulation SYNC detector circuit 15. The demodulation SYNC detector circuit 15 detects a reference signal in each frame within the binary value signal, 8–10 demodulates the binary value signal, and supplies an error correction decoder 16 with the resulting demodulated data. The error correction decoder 16 corrects possible errors in the demodulated data in accordance with the detected reference signal, and outputs the corrected data as reproduced data.

Next, the operation of the read signal multiplexing circuit 127 will be described.

It should be noted that the read signal multiplexing circuit 127 is provided for producing read signals correctly corresponding to respective tracks even under a condition that a track width of each track formed on a magnetic tape 24 is not an integer multiple of the width of each head in the reproducing head assembly 125, and the multiple is not previously known.

Figure 24:
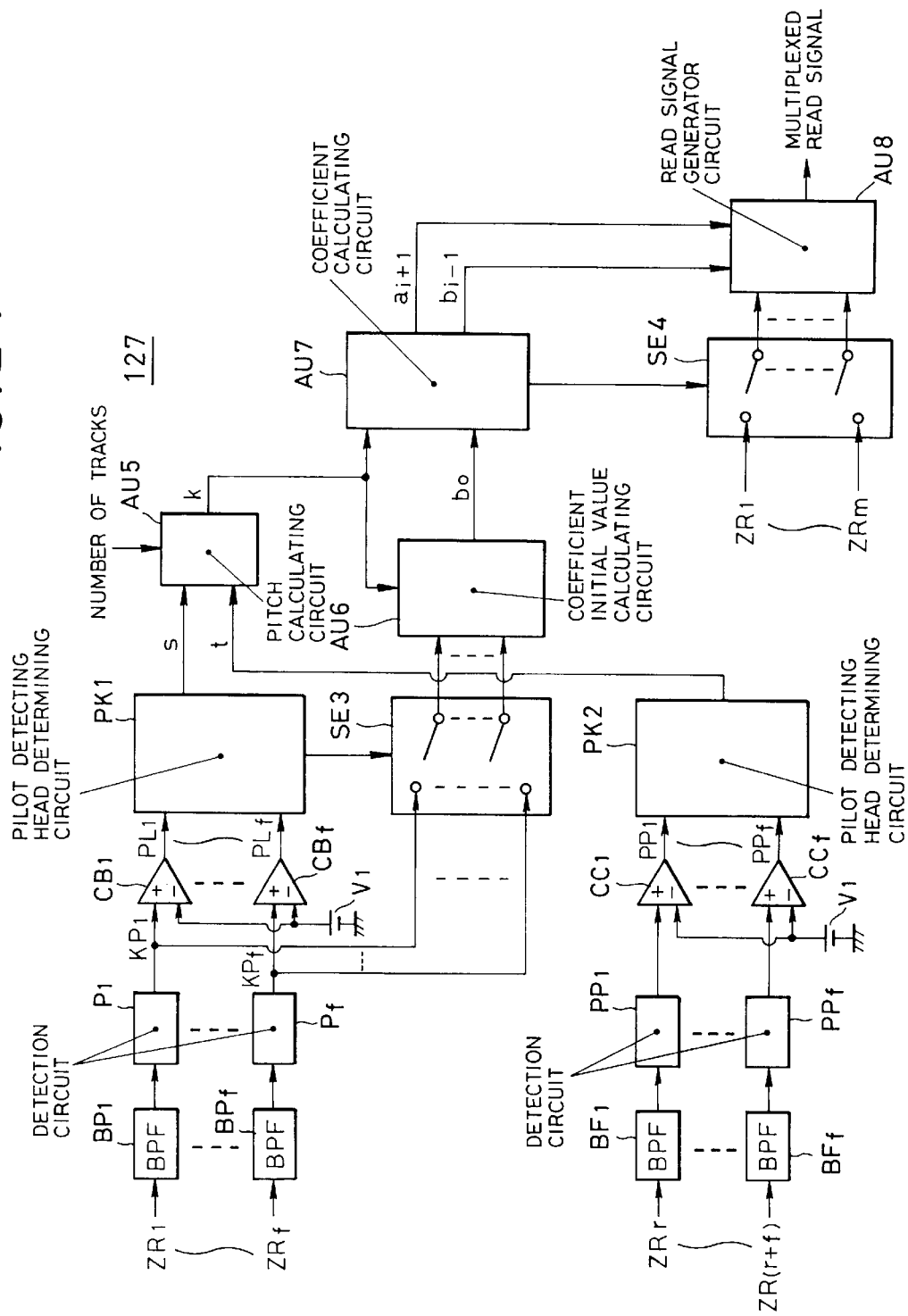
FIG. 24 is a circuit diagram illustrating the internal configuration of a read signal multiplexing circuit 127 in FIG. 19.

FIG. 24 is a circuit diagram illustrating the internal configuration of the read signal multiplexing circuit 127. Referring specifically to FIG. 24, bandpass filters $BP_1$–$BP_f$ extract signals in a pilot signal bands from associated amplified read signals $ZR_1$–$ZR_f$ output from the reproducing amplifier 126, and supply associated pilot signal detection circuits $P_1$–$P_f$ with the respective extracted signals. These amplified read signals $ZR_1$–$ZR_f$ are output from associated heads $MMR_1$–$MMR_f$, all of which are predicted to trace the track T0 on which the first pilot signal, as illustrated in FIG. 21, is recorded, within the heads $MMR_1$–$MMR_m$.

The pilot signal detection circuits $P_1$–$P_f$ detect the pilot signal from the signals supplied from the associated bandpass filters BP1–BPf to produce detection signals $KP_1$–$KP_f$, respectively, and supply associated comparators $CB_1$–$CB_f$ with the respective detection signals $KP_1$–$KP_f$. The comparators $CB_1$–$CB_f$ each generate a pilot detecting signal PL, for example, at logical value "1" when the detection signals $KP_1$–$KP_f$ from the associated pilot signal detection circuits $P_1$–$P_i$ are higher than a predetermined level $V_1$, and generate the pilot detecting signal PL at logical value "0" when they are lower than the predetermined level $V_1$. The comparator $CB_1$–$CB_f$ each supply a pilot detecting head determining circuit PK1 with pilot detecting signals $PL_1$–$PL_f$ each having a logical value as mentioned above.

The pilot detecting head determining circuit PK1 first extracts all pilot detecting signals PL at logical value "1" from the pilot detecting signals $PL_1$–$PL_f$. Next, the pilot detecting head determining circuit PK1 determines the smallest signal number of those attached to the extracted pilot detecting signals PL, and supplies a pitch calculating circuit AU5 with head number information s corresponding to this determined signal number. Further, the pilot detecting head determining circuit PK1 supplies a selector SE3 with a selection control signal for selecting all detection signals KP from which pilot detecting signals PL at logical value "1" have been derived.

The selector SE3 selects all detection signals KP conforming to the selection control signal from the detection signals $KP_1$–$KP_f$, and supplies them to a coefficient initial value calculating circuit AU6.

Bandpass filters $BF_1$–$BF_f$ extract signals in pilot signal bands from associated amplified read signals $ZR_r$–$ZR_{(r+f)}$ output from the reproducing amplifier 126, and supply associated pilot signal detection circuits $PP_1$–$PP_f$ with the respective extracted signals. These amplified read signals $ZR_r$–$ZR_{(r+f)}$ are output from associated heads $MMR_r$–$MMR_{(r+f)}$, all of which are predicted to trace a track on which the second pilot signal, as illustrated in FIG. 21, is recorded, within the heads $MMR_1$–$MMR_m$.

The pilot signal detection circuits $PP_1$–$PP_f$ each detect the pilot signal from the signals supplied from the associated bandpass filters $BF_1$–$BF_f$ to produce detection signals, and supply associated comparators $CC_1$–$CC_f$ with the respective detection signals. The comparators $CC_1$–$CC_f$ each generate a pilot detecting signal PL, for example, at logical value "1" when the signal levels of the associated detection signals are higher than the predetermined level $V_1$, and generate the pilot detecting signal PL at logical value "0" when they are lower than the predetermined level $V_1$. The comparator $CC_1$–$CC_f$ each supply a pilot detecting head determining circuit PK2 with pilot detecting signals $PP_1$–$PP_f$ each having a logical value as mentioned above.

The pilot detecting head determining circuit PK2 first selects all pilot detecting signals PP at logical value "1" from the pilot detecting signals $PP_1$–$PP_f$. Next, the pilot detecting head determining circuit PK2 determines the largest signal number of those attached to the extracted pilot detecting signals PP, and supplies the pitch calculating circuit AU5 with head number information t corresponding to the determined signal number.

The pitch calculating circuit AU5 performs the following calculation using the number of tracks n formed in one track block as well as the head number information s and t to calculate a track pitch k of each track formed on the magnetic tape 24:

$$k \simeq (t-s)/(n+2)$$

Figure 25:
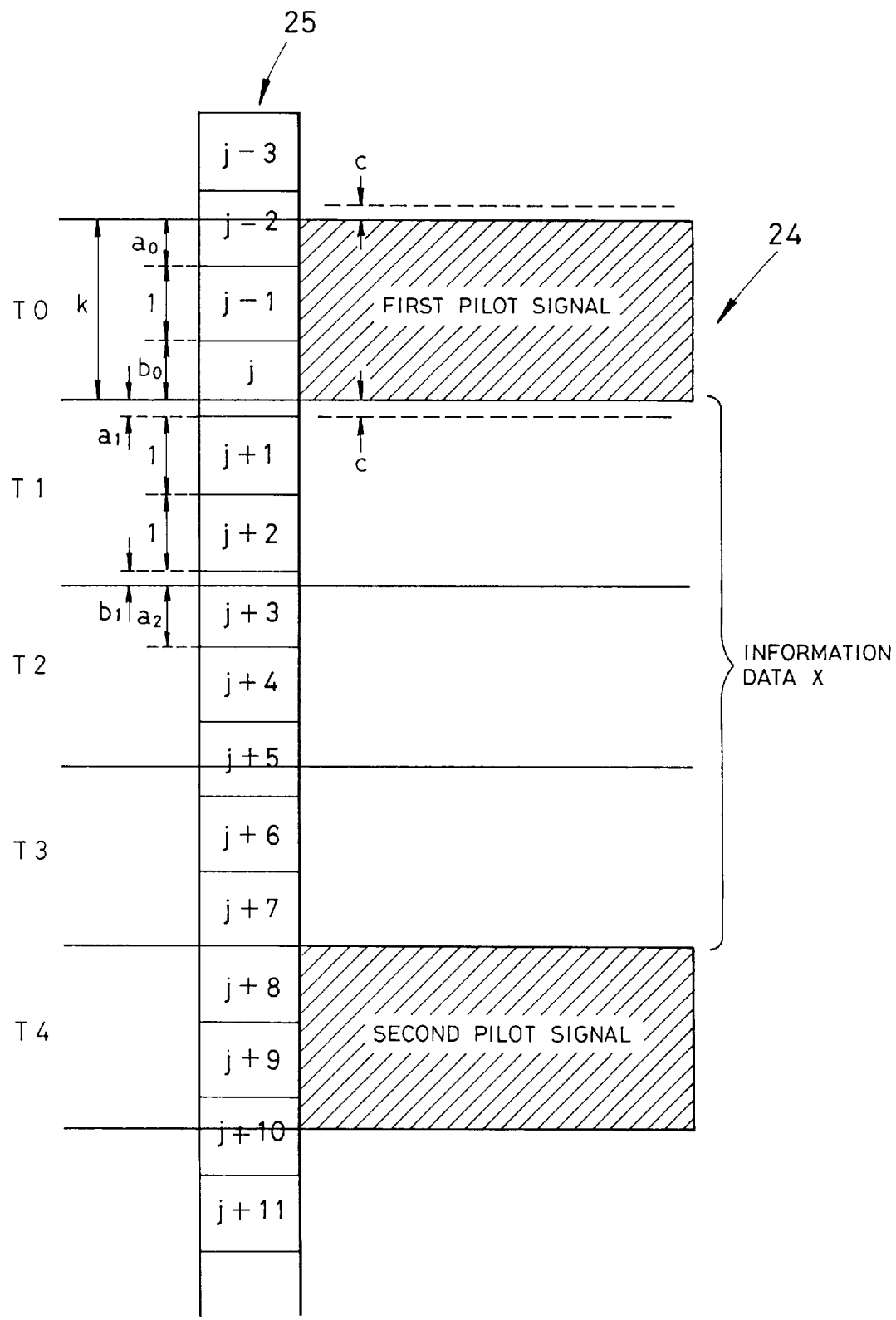
FIG. 25 is a diagram illustrating a positional relationship established when respective heads trace respective associated tracks on a magnetic tape 24 illustrated in FIG. 19.

For example, when the reproducing head assembly 25 reads recorded information from the magnetic tape 24 in a relative positional relationship as illustrated in FIG. 25, the pilot detecting head determining circuit PK1 first determines a head $MMP_{(j-2)}$ as a pilot detecting head within the respective heads disposed in the reproducing head assembly 25.

In this event, the pilot detecting head determining circuit PK1 therefore supplies the pitch calculating circuit AU5 with the head number information s expressed by:

$$s=(j-2)$$

Next, the pilot detecting head determining circuit PK2 determines a head $MMR_{(j+10)}$ as a pilot detecting head within the respective heads disposed in the reproducing head assembly 25.

In this event, the pilot detecting head determining circuit PK2 therefore supplies the pitch calculating circuit AU5 with the head number information t expressed by:

$$t=(j+10)$$

Since the number of track for information data X is "3," the pitch calculating circuit AU5 calculates the track pitch k as follows:

$$k \simeq \{(j+10)-(j-2)\}/(3+2)=2.4$$

In this way, it is revealed that the track pitch k of each track formed on the magnetic tape 24 is "2.4" (when the width of a head is "1") in the example illustrated in FIG. 25.

The pitch calculating circuit AU5 supplies the track pitch k to a coefficient initial value calculating circuit AU6 and a coefficient calculating circuit AU7, respectively.

The coefficient initial value calculating circuit AU6 calculates widths of the track T0 traced by two heads positioned at both ends of heads which have traced the track T0, based on the detection signal KP supplied from the selector SE3 and the track pitch k.

For example, in FIG. 25, heads which can trace the track T0 are heads $MMR_{(j-2)}$, $MMR_{(j-1)}$ and $MMR_j$. In this event, the heads $MMR_{(j-2)}$, $MMR_j$ positioned at both ends trace boundaries of the track T0. Therefore, a width of the track T0 which can be traced by the head $MMR_{(j-2)}$ is "$a_0$" as illustrated in FIG. 25, while a width of the track T0 which can be traced by the head $MMR_j$ is "$b_0$."

The coefficient initial value calculating circuit AU6 produces the tracing width $b_0$ in the following manner.

First, the coefficient initial value calculating circuit AU6 selects detection signals produced by detecting pilot signals for read signals read by respective heads except for the heads positioned at both ends which have traced the boundaries of the track T0, from detection signals KP supplied from the selector SE3, and calculates an average value P of the selected detection signals KP.

Next, the coefficient initial value calculating circuit AU6 selects detection signals KP produced by detecting the pilot signals for read signals read by the respective heads which have traced the boundaries of the track T0, from the detection signals KP supplied from the selector SE3. These detection signals are designated by $P_a$, $P_b$, respectively. For example, in the example illustrated in FIG. 25, the heads positioned at both ends which trace the boundaries of the track T0 are the heads $MMR_{(j-2)}$, $MMR_j$.

The width of the track T0 traced by the head MMR corresponds to the level of a detection signal produced by detecting the pilot signal for a read signal from this head, so that, assuming that the average value P is "1," the following expressions are given:

$$P_a:P=(a_0+C):1, \; P_b:P=(b_0+C):1$$

Transforming these expressions for $b_0$:

$$b_0=(P_b/P)-C$$

is given, where "C" indicates a width in which the first pilot signal leaks into the adjacent track, as illustrated in FIG. 25.

Next, the coefficient initial value calculating circuit AU6 calculates the sum Q of signal levels produced by adding the detection signals KP supplied from the selector SE3.

The sum Q can be calculated by the following equation:

$$Q = q_0 \cdot P + P_a + P_b$$

where $q_0$ indicates the number of heads except for the heads at both ends which have traced the boundaries of the track T0. For example, in the embodiment illustrated in FIG. 25, $q_0$ is one.

Therefore, the sum Q is expressed by:

$$Q = q_0 \cdot P + (a_0 + C) P + (b_0 + C) P$$

From this equation, the following equation is given:

$$q_0 + a_0 + b_0 = (Q/P) - 2C$$

In this event, assuming that the width of a head is "1," $(q_0 + a_0 + b_0)$ on the left side is nothing more than the track pitch k, so that the following equation is given:

$$k = (Q/P) - 2C$$

and from this equation:

$$C = (\tfrac{1}{2}) \cdot \{(Q/P) - K\}$$

is derived.

In summary, the coefficient initial value calculating circuit AU6 eventually calculates widths of the track T0 up to the respective boundaries traced by the two heads positioned at both ends of the heads which have traced the track T0, by executing the following calculation, and supplies the coefficient calculating circuit AU7 with an initial tracing width b0:

$$b_0 (P_b/P) - (\tfrac{1}{2}) \cdot \{(Q/P) - k\}$$

The coefficient calculating circuit AU7 supplies a selector SE4 with a selection control signal for sequentially selecting read signals from respective heads $MMR_1 - MMR_m$ corresponding to each track based on the initial tracing width b0 and the track pitch k calculated by the pitch calculating circuit AU5.

Also, the coefficient calculating circuit AU7 calculates a first boundary tracing width a(i+1) and a second boundary tracing width $b_{(i-1)}$ for each track $T_i$, based on the initial tracing width $b_0$ and the track pitch k. For example, in the example of FIG. 25, the first boundary tracing width $a_{(i+1)}$ in a track $T_1$ is $a_2$ as indicated in the figure, and the second boundary tracing width $b_{(i-1)}$ is $b_0$ in the figure. Stated another way, the coefficient calculating circuit AU7 calculates, for a plurality of heads which have traced a track $T_i$, widths of tracks adjacent to this track $T_i$ traced by heads at both ends which have traced on the boundaries of the track $T_i$, as the first boundary tracing width $a_{(i+1)}$ and the second boundary tracing width $b_{(i-1)}$, and supplies them to a read signal generator circuit AU8.

Figure 26:
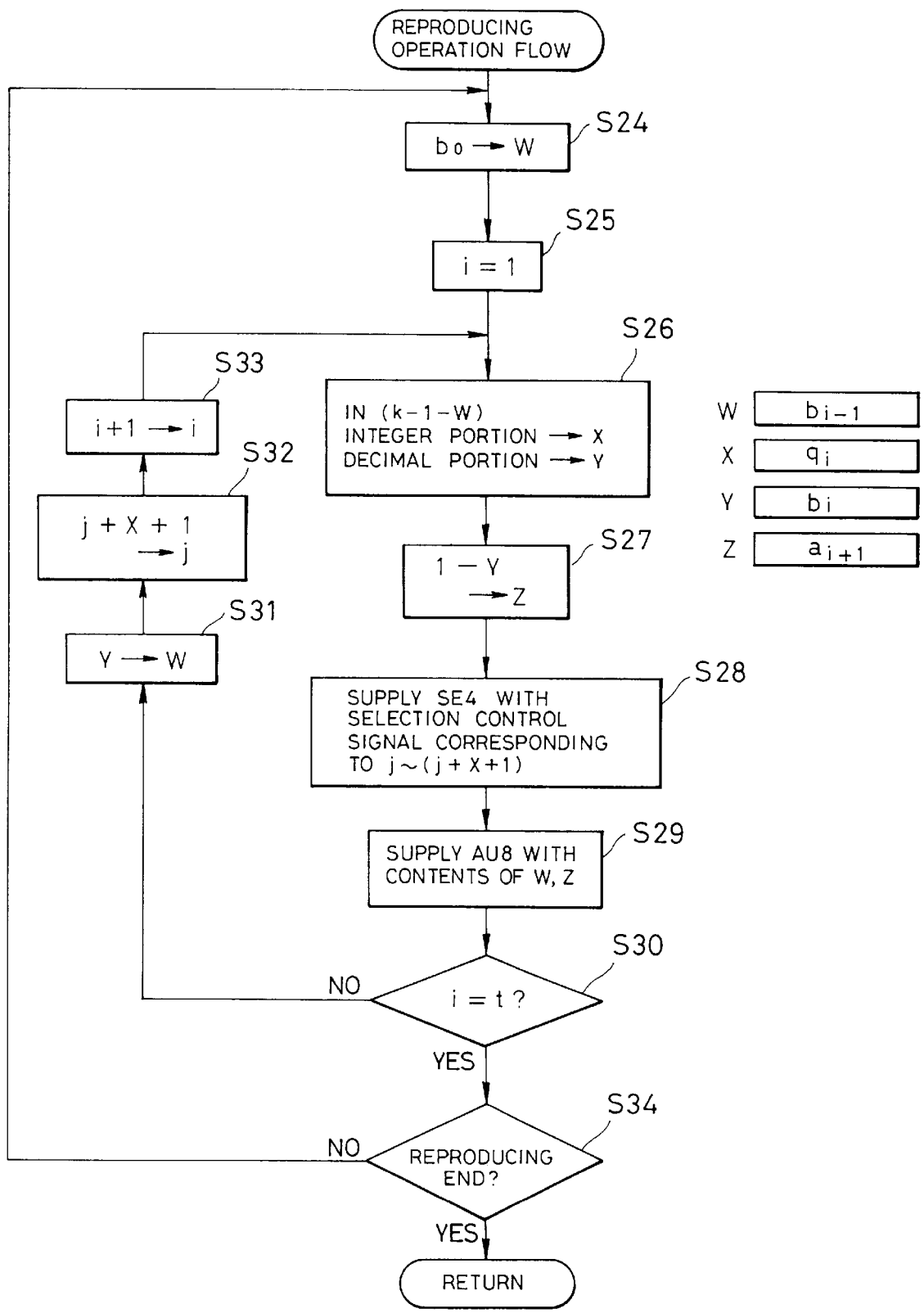
FIG. 26 is a flow diagram representing an operational flow in a coefficient calculating circuit AU7 illustrated in FIG. 19.

FIG. 26 is a flow diagram representing an operation flow executed by the coefficient calculating circuit AU7.

Referring specifically to FIG. 26, the coefficient calculating circuit AU7 first fetches an initial trace value $b_0$ supplied from the coefficient initial value calculating circuit AU6, and stores this as the second boundary tracing width $b_{(i-1)}$ in a built-in register W (step S24). Next, the coefficient calculating circuit AU7 sets an initial value "1" as a read track number i indicative of a track to be read (step S25). Then, the coefficient calculating circuit AU7 performs a calculation expressed by:

$$\{k - 1 - (\text{stored contents of } W: b_{(i-1)})\}$$

based on the track pitch k supplied from the pitch calculating circuit AU5 and the contents stored in the register W, and stores an integer portion of the calculation result in a built-in register X as q, and a decimal portion of the same in a built-in register Y as bi (step S26). Next, the coefficient calculating circuit AU7 performs a calculation expressed by:

$$\{1 - (\text{stored contents of } Y: b_i)\}$$

and stores the calculation result in a built-in register X as the first boundary tracing width $a_{(i-1)}$ (step S27).

Next, the coefficient calculating circuit AU7 supplies the selector SE4 with a selection control signal for selecting an amplified read signal ZR corresponding to each signal number indicated by:

$$j \sim \{j + (\text{stored contents of } X: q_i) + 1\}$$

(step S28). The selector SE4, in response to the execution of step S28, simultaneously selects amplified read signals $ZR_j - ZR_{(j+qi+1)}$ conforming to the selection control signal from amplified read signals $ZR_1 - ZR_m$ supplied from the reproducing amplifier 126, and supplies them to the read signal generator circuit AU8.

At this time, the coefficient calculating circuit AU7 supplies the read signal generator circuit AU8 with the second boundary tracing width $b_{(i-1)}$ and the first boundary tracing width $a_{(i-1)}$ which have been stored in the built-in registers W, Z, respectively (step S29). The read signal generator circuit AU8, in response to the execution of step S29, adds the amplified read signals $ZR_j - ZR_{(j+qi+1)}$ supplied from the selector SE4 to derive a total sum S. Then, the read signal generator circuit AU8 performs the following calculation:

$$S - \{ZR_j \cdot b_{(i-1)} + ZR_{(j+qi+1)} \cdot a_{(i+1)}\}$$

and supplies the A/D converter 11 illustrated in FIG. 19 with the calculation result as a time division multiplexed read signal read from the track $T_i$.

For example, in the example illustrated in FIG. 25, the time division multiplexed read signal read from the track $T_i$ is produced by subtracting the value of an amplified read signal $ZR_j \cdot b_0$ and the value of an amplified read signal $ZR_{(j+3)}$ a from the total sum S of amplified read signals $ZR_j - ZR_{(j+3)}$ produced by the respective heads $MMR_j - MMR_{(j+3)}$. Next, the coefficient calculating circuit AU7 determines whether or not the read track number i is equal to "t" (step S30). The value "t" indicates the number of tracks formed in one track block. If it is determined at step S30 that the read track number i is not equal to "t," the coefficient calculating circuit AU7 overwrites the built-in register W with the contents stored in the built-in register Y, i.e., bi as a new second boundary tracing width $b_{(i-1)}$ (step S31). Next, the coefficient calculating circuit AU7 adds "1" to the aforementioned $\{j + (\text{stored contents of } X: q_i) + 1\}$, and updates j with the addition result (step S32). Next, the coefficient calculating circuit AU7 adds "1" to the read track number i to derive a new read track number i (step S33). After the end of step S33, the coefficient calculating circuit AU7 returns to the execution of step S26 to repetitively execute the operations as described above.

At step S30, if it is determined that the read track number i is equal to "t," the coefficient calculating circuit AU7 next determines whether or not a reproducing operation end instruction has been issued from the control unit 600 illustrated in FIG. 19 (step S34). If it is determined at step S34 that no reproducing operation end instruction has been issued, the coefficient calculating circuit AU7 returns to the execution of step S24 as described above. On the other hand, if it is determined at step S34 that the reproducing operation end instruction has been issued, the coefficient calculating circuit AU7 terminates the control operation in accordance with this flow.

As described above, the read signal multiplexing circuit 127 as illustrated in FIG. 24 enables read signals to be reproduced correctly corresponding to each track even under a condition that a track pitch of each track formed on the magnetic tape 24 is not an integer multiple of the width of each head in the reproducing head assembly 25, and the multiple is not previously known.

While the read signal generator circuit AU8 illustrated in FIG. 24 produces a time division multiplexed read signal using amplified read signals from all heads which trace a track $T_i$, the present invention is not limited to this particular configuration.

Alternatively, the time division multiplexed read signal may be produced, for example, using only amplified read signals from heads except for heads at both ends which trace on the boundaries of a track T. within heads which trace the track $T_i$.

Figure 27:
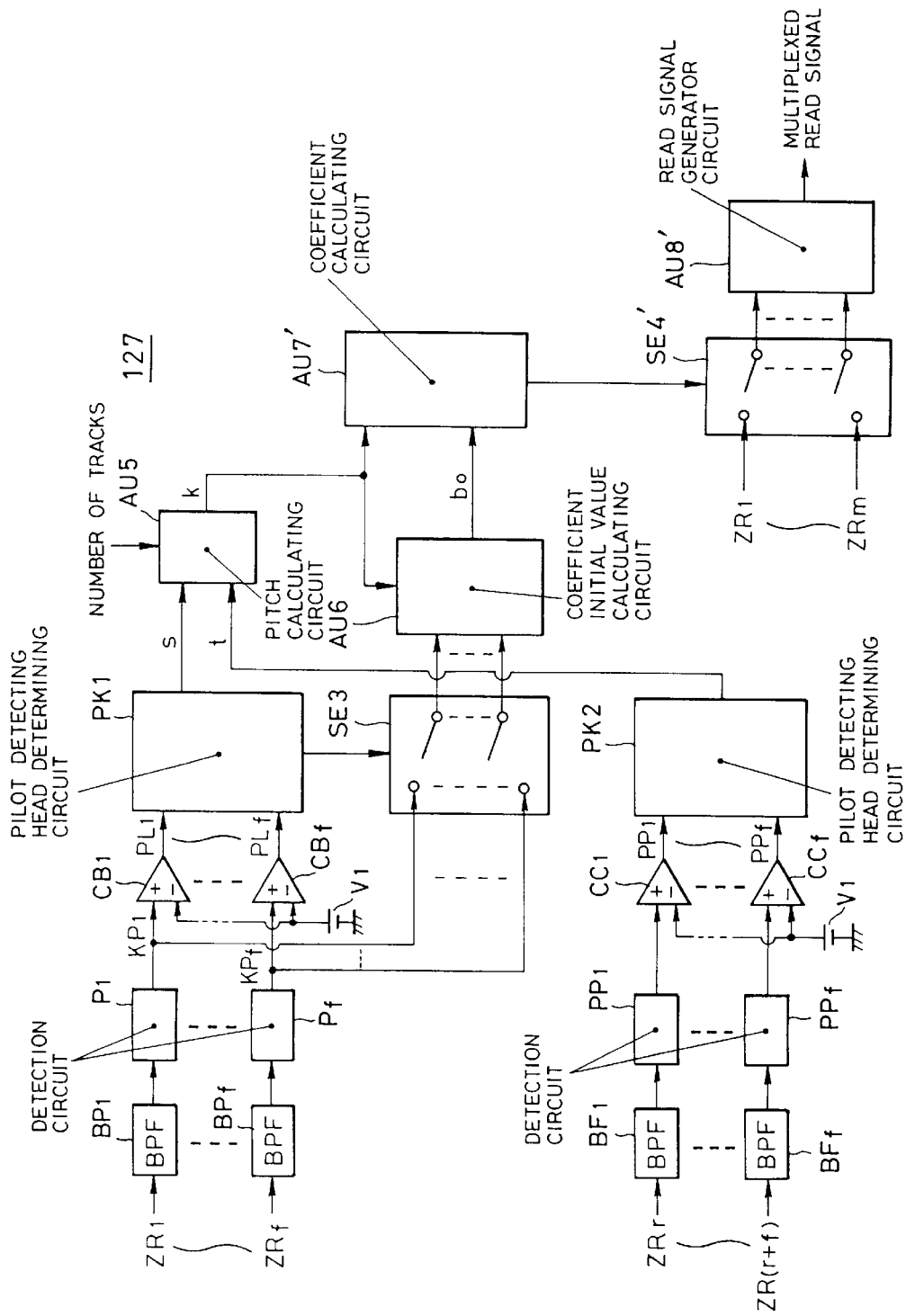
FIG. 27 is a block diagram illustrating the configuration of an information recording/reproducing apparatus as a sixth embodiment of the present invention.

FIG. 27 is a block diagram illustrating the configuration of an information recording/reproducing apparatus according to a further embodiment of the present invention which has been made in view of the alternative configuration.

It should be noted that since functional modules except for a coefficient calculating circuit AU7', a selector SE4' and a read signal generator circuit AU8' have the same functions as corresponding ones illustrated in FIG. 24, the following description will be centered on operations of these coefficient calculating circuit AU7', selector SE4' and re ad signal generator circuit AU8'.

Figure 28:
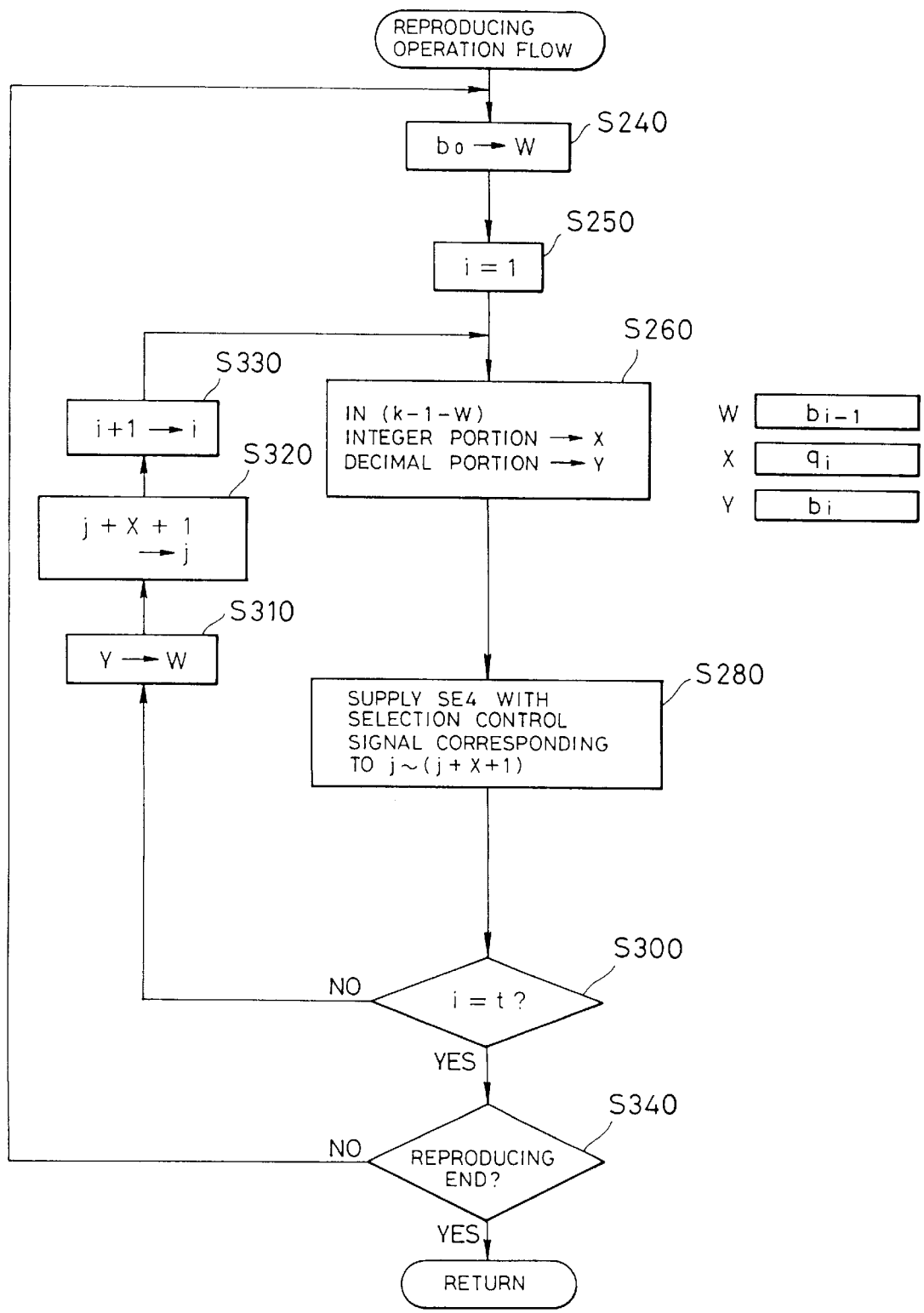
FIG. 28 is a flow diagram representing an operation flow of a coefficient calculating circuit AU7' illustrated in FIG. 27.

FIG. 28 is a flow diagram representing an operation flow of the coefficient calculating circuit AU7'.

Referring specifically to FIG. 28, the coefficient calculating circuit AU7' first fetches an initial trace value b0 supplied from the coefficient initial value calculating circuit AU6, and stores this as the second boundary tracing width $b_{(i-1)}$ in a built-in register W (step S240). N ext, the coefficient calculating circuit AU7' sets an initial value "1" as a read track number i indicative of a track to be read (step S250). Then, the coefficient calculating circuit AU7' performs a calculation expressed by:

$$\{k-1=\text{(stored contents of } W: b_{(i-1)}\}$$

based on the track pitch k supplied from the pitch calculating circuit AU5 and the contents stored in the register W, and stores an integer portion of the calculation result in a built-in register X as qi and a decimal portion of the same in a built-in register Y as $b_i$ (step S260).

Next, the coefficient calculating circuit AU7' supplies the selector SE4' with a selection control signal for selecting an amplified read signal ZR corresponding to each signal number indicated by:

$j\simeq\{j+(\text{stored contents of X: } q_i)+1\}$ (step S280). The selector SE4', in response to the execution of step S280, simultaneously selects amplified read signals $ZR_j$–$ZR_{(j+qi+1)}$ conforming to the selection control signal from amplified read signals $ZR_1$–$ZR_m$ supplied from the reproducing amplifier 126, and supplies them to the read signal generator circuit AU8'.

The read signal generator circuit AU8' adds all amplified read signals $ZR_j$–$ZR_{(j+qi+1)}$ supplied from the selector SE4' except for the amplified read signals $ZP_j$, $ZR_{(i+qi+1)}$ at both ends to derive the sum which is supplied to the A/D converter 11 illustrated in FIG. 19 as a time division multiplexed read signal read from the track $T_i$.

For example, in the example illustrated in FIG. 25, the time division multiplexed read signal read from the track T1 is calculated by adding amplified read signals $ZR_{(j+1)}$, $ZR_{(j+2)}$ generated by respective heads $MMR_{(j+1)}$, $MMR_{(j+2)}$ except the heads at both ends within heads $MMR_j$–$MMR_{(j+3)}$ which trace the track T1.

Next, the coefficient calculating circuit AU7' determines whether or not the read track number i is equal to "t" (step S300). The value "t" indicates the number of tracks formed in one track block. If it is determined at step S300 that the read track number i is not equal to "t," the coefficient calculating circuit AU7' overwrites the built-in register W with the contents stored in the built-in register Y, i.e., bi as a new second boundary tracing width $b_{(i-1)}$ (step S310). Next, the coefficient calculating circuit AU7' adds "1" to the aforementioned $\{j+(\text{stored contents of X: } q_i)+1\}$, and updates j with the addition result (step S320). Next, the coefficient calculating circuit AU7' adds "1" to the read track number i to derive a new read track number i (step S330). After the end of step S330, the coefficient calculating circuit AU7' returns to the execution of step S260 to repetitively execute the operations as described above.

Conversely, if it is determined at step S300 that the read track number i is equal to "t," the coefficient calculating circuit AU7' next determines whether or not a reproducing operation end instruction has been issued from the control unit 600 illustrated in FIG. 19 (step S340). If it is determined at step S340 that no reproducing operation end instruction has been issued, the coefficient calculating circuit AU7' returns to the execution of step S240 as described above. On the other hand, if it is determined at step S340 that the reproducing operation end instruction has been issued, the coefficient calculating circuit AU7' terminates the control operation in accordance with this flow.

In summary, the read signal generator circuit AU8' illustrated in FIG. 27 produces a time division multiplexed read signal using only amplified read signals from heads except for those at both ends, which trace on the boundaries of a track T1, within heads which trace the track T1.

While the foregoing embodiments have been described in connection with an information reading operation for reading information from a magnetic tape, the recording medium is not limited to a magnetic tape. In short, the present invention can be applied to any recording medium such as that on which one track each is recorded, a read only recording medium and so on, as long as an information recording/reproducing apparatus is provided with multiple heads, and tracks formed on a recording medium in blocks have a fixed track width.

What is claimed is:

1. An information recording/reproducing apparatus for reproducing recorded information from a recording medium on which information data is recorded, wherein said recording medium is formed with at least one pilot track on which a pilot signal is recorded and a plurality of information data tracks on which said information data is recorded, said at least one pilot track and said information data tracks being arranged adjacent to each other, said apparatus comprising:

a plurality of reading means arranged in a width direction of said tracks, each of said reading means having a tracing width equal to or smaller than one half of a width of a track of said tracks;

pilot signal detecting means for detecting said pilot signal from read signals read by pilot signal reading means, wherein said pilot signal reading means are some of said plurality of reading means;

track determining means for determining a corresponding relationship between said reading means and said information data tracks in accordance with a detection result provided by said pilot signal detecting means; and means for sequentially selecting selected read signals from said read signals read by said reading means in accordance with a determination result provided by said track determining means to output the selected read signals as read signals respectively corresponding to said information data tracks.

2. An information recording/reproducing apparatus according to claim 1, wherein:

said track width is N times as much as said tracing width, where N is an integer equal to or more than two;

said track determining means identifies all of said pilot signal reading means which have read said pilot signal based on the detection result provided by said pilot signal detecting means; and said means for sequentially selecting sequentially selects said selected read signals by selecting said read signals read by respective reading means positioned at intervals of (N−1) from a reading means next to one of said pilot signal reading means positioned at an extreme end within said pilot signal reading means, and determines the selected read signals as read signals read from the respective information data tracks.

3. An information recording/reproducing apparatus according to claim 1, wherein the number of said reading means is larger than twice a total sum of the number of said information data tracks formed on said recording medium and the number of said pilot tracks.

4. An information recording/reproducing apparatus according to claim 1, wherein said pilot signal is a frequency signal having a wavelength longer than that of a recorded signal corresponding to said information data.

5. An information recording/reproducing apparatus for reproducing recorded information from a recording medium on which information data is recorded, wherein said recording medium is formed with two pilot tracks on which first and second pilot signals are recorded, respectively, and a plurality of information data tracks which are sandwiched by said pilot tracks and on which said information data is recorded, said apparatus comprising:

a plurality of reading means lined up in a width direction of said tracks without gap therebetween, each of said reading means having a tracing width equal to or smaller than one half of a width of a track of said tracks;

pilot signal detecting means for detecting said first pilot signal and said second pilot signal from read signals read by pilot signal reading means, wherein said pilot signal reading means air some of said plurality of reading means;

track pitch calculating means for calculating a track width of said information data tracks based on positioning intervals of said pilot signal reading means corresponding to said first and second pilot signals detected by said pilot signal detecting means; and means for sequentially selecting selected read signals corresponding to said information data tracks based on said track width calculated by said track pitch calculating means and for outputting the selected read signals as read signals respectively corresponding to said information data tracks.

6. An information recording/reproducing apparatus for reproducing recorded information from a recording medium on which information data is recorded, wherein said recording medium is formed with at least one pilot track on which a pilot signal is recorded and a plurality of information data tracks on which said information data is recorded said at least one pilot track and said information data tracks being arranged adjacent to each other, said apparatus comprising:

a plurality of reading heads arranged in a width direction of said tracks, each of said reading heads having a tracing width equal to or smaller than one half of a width of a track of said tracks;

a pilot signal detection circuit that detects said pilot signal from read signals read by pilot signal reading heads, wherein said pilot signal reading heads are some of said plurality of reading heads;

a track determining circuit that determines a corresponding relationship between said reading heads and said information data tracks in accordance with a detection result provided by said pilot signal detection circuit; and a selection circuit that sequentially selects selected read signals from said read signals read by said reading heads in accordance with a determination result provided by said track determining circuit to output the selected read signals as read signals respectively corresponding to said information data tracks.

7. An information recording/reproducing apparatus according to claim 6, wherein:

said track width is N times as much as said tracing width, where N is an integer equal to or more than two;

said track determining circuit identifies all of said pilot signal reading heads which have read said pilot signal based on the detection result provided by said pilot signal detection circuit; and said selection circuit sequentially selects said selected read signals by selecting said read signals read by respective reading heads positioned at intervals of (N−1) from a reading head next to one of said pilot signal reading heads positioned at an extreme end within said pilot signal reading heads, and determines the selected read signals as read signals read from the respective information data tracks.

8. An information recording/reproducing apparatus according to claim 5, wherein the number of said reading heads is larger than twice a total sum of the number of said information data tracks formed on said recording medium and the number of said pilot tracks.

9. An information recording/reproducing apparatus according to claim 5, wherein said pilot signal is a frequency signal having a wavelength longer than that of a recorded signal corresponding to said information data.

10. An information recording/reproducing apparatus for reproducing recorded information from a recording medium on which information data is recorded, wherein said recording medium is formed with two pilot tracks on which first and second pilot signals are recorded, respectively, and a plurality of information data tracks which are sandwiched by said pilot tracks and on which said information data is recorded, said apparatus comprising:

a plurality of reading heads lined up in a width direction of said tracks without gap therebetween, each of said reading heads having a tracing width equal to or smaller than one half of a width of a track of said tracks;

a pilot signal detection circuit that detects said first pilot signal and said second pilot signal from read signals read by pilot signal reading heads, wherein said pilot signal reading heads are some of said plurality of reading heads;

a track pitch calculating circuit that calculates a track width of said information data tracks based on positioning intervals of said pilot signal reading heads corresponding to said first and second pilot signals detected by said pilot signal detection circuit; and a selection circuit that sequentially selects selected read signals corresponding to said information data tracks based on said track width calculated by said track pitch calculating circuit and for outputting the selected read signals as read signals respectively corresponding to said information data tracks.

* * * * *